(12) United States Patent
Schneider et al.

(10) Patent No.: US 12,472,148 B2
(45) Date of Patent: Nov. 18, 2025

(54) IMPLANTABLE DEVICE FOR SUSTAINED RELEASE OF A MACROMOLECULAR DRUG COMPOUND

(71) Applicant: Celanese EVA Performance Polymers LLC, Irving, TX (US)

(72) Inventors: Christian Schneider, Hattersheim (DE); Jeffrey C. Haley, Norwood, OH (US); Dirk Hair, Edmonton (CA); Harsh Patel, Union, KY (US); Vijay Gyanani, Powell, OH (US)

(73) Assignee: Celanese EVA Performance Polymers LLC, Irving, TX (US)

( * ) Notice: Subject to any disclaimer, the term of this patent is extended or adjusted under 35 U.S.C. 154(b) by 501 days.

(21) Appl. No.: 17/725,606

(22) Filed: Apr. 21, 2022

(65) Prior Publication Data

US 2022/0347105 A1 Nov. 3, 2022

Related U.S. Application Data

(60) Provisional application No. 63/311,517, filed on Feb. 18, 2022, provisional application No. 63/300,767, filed on Jan. 19, 2022, provisional application No. 63/252,287, filed on Oct. 5, 2021, provisional application No. 63/179,620, filed on Apr. 26, 2021.

(51) Int. Cl.
| | |
|---|---|
| *A61K 9/48* | (2006.01) |
| *A61K 47/26* | (2006.01) |
| *A61K 47/32* | (2006.01) |
| *C07K 16/28* | (2006.01) |

(52) U.S. Cl.
CPC ............ *A61K 9/4816* (2013.01); *A61K 47/26* (2013.01); *A61K 47/32* (2013.01); *C07K 16/2818* (2013.01); *C07K 16/2827* (2013.01)

(58) Field of Classification Search
None
See application file for complete search history.

(56) References Cited

U.S. PATENT DOCUMENTS

| | | | |
|---|---|---|---|
| 2,425,389 A | 8/1947 | Oxley et al. | |
| 2,859,241 A | 11/1958 | Schnizer | |
| 4,014,335 A | 3/1977 | Arnold | |
| 4,069,307 A | 1/1978 | Higuchi et al. | |
| 4,164,560 A | 8/1979 | Folkman et al. | |
| 4,357,312 A | 11/1982 | Hsieh et al. | |
| 4,391,797 A | 7/1983 | Folkman et al. | |
| 4,418,068 A | 11/1983 | Jones | |
| 4,588,394 A | 5/1986 | Schulte et al. | |
| 4,663,147 A | 5/1987 | DePrince | |
| 4,666,704 A | 5/1987 | Shalati et al. | |
| 4,792,448 A | 12/1988 | Ranade | |
| 4,843,170 A | 6/1989 | Isshiki et al. | |
| 4,863,735 A | 9/1989 | Kohn et al. | |
| 4,883,666 A | 11/1989 | Sabel et al. | |
| 4,891,225 A | 1/1990 | Langer et al. | |
| 4,898,734 A | 2/1990 | Mathiowitz et al. | |
| 4,900,556 A | 2/1990 | Wheatley et al. | |
| 4,933,185 A | 6/1990 | Wheatley et al. | |
| 4,952,406 A | 8/1990 | Brown et al. | |
| 4,957,119 A | 9/1990 | De Nijs | |
| 4,989,734 A | 2/1991 | Mode et al. | |
| 5,008,112 A | 4/1991 | DePrince et al. | |
| 5,034,506 A | 7/1991 | Summerton et al. | |
| 5,088,505 A | 2/1992 | De Nijs | |
| 5,100,668 A | 3/1992 | Edelman et al. | |
| 5,142,047 A | 8/1992 | Summerton et al. | |
| 5,150,718 A | 9/1992 | De Nijs | |
| 5,166,315 A | 11/1992 | Summerton et al. | |
| 5,185,444 A | 2/1993 | Summerton et al. | |
| 5,217,866 A | 6/1993 | Summerton et al. | |
| 5,302,397 A | 4/1994 | Amsden et al. | |
| 5,324,523 A | 6/1994 | Zsuga et al. | |
| 5,330,768 A | 7/1994 | Park et al. | |
| 5,378,475 A | 1/1995 | Smith et al. | |
| 5,439,688 A | 8/1995 | Orsolini et al. | |
| 5,506,337 A | 4/1996 | Summerton et al. | |
| 5,512,293 A | 4/1996 | Landrau et al. | |
| 5,514,378 A | 5/1996 | Mikos et al. | |
| 5,521,063 A | 5/1996 | Summerton et al. | |
| 5,543,465 A | 8/1996 | Bell et al. | |
| 5,545,409 A | 8/1996 | Laurencin et al. | |
| 5,601,835 A | 2/1997 | Sabel et al. | |
| 5,626,862 A | 5/1997 | Brem et al. | |
| 5,626,877 A | 5/1997 | Amsden et al. | |
| 5,639,810 A | 6/1997 | Smith, III | |
| 5,686,877 A | 11/1997 | Keller et al. | |
| 5,698,685 A | 12/1997 | Summerton et al. | |
| 5,733,565 A | 3/1998 | Moo-Young et al. | |

(Continued)

FOREIGN PATENT DOCUMENTS

| | | |
|---|---|---|
| AU | 765149 B2 | 9/2003 |
| CA | 2176145 | 5/1995 |

(Continued)

OTHER PUBLICATIONS

Abstract—Almeida et al., "Ethylene vinyl acetate as matrix for oral sustained release dosage forms produced via hot-melt extrusion," *European Journal of Pharmaceutics and Biopharmaceutics*, vol. 77, Issue 2, Feb. 2011, pp. 297-305.

(Continued)

*Primary Examiner* — Melissa S Mercier
(74) *Attorney, Agent, or Firm* — Dority & Manning, P.A.

(57) ABSTRACT

An implantable device for delivery of a macromolecular drug compound is provided. The device comprises a core having an outer surface and a membrane layer positioned adjacent to the outer surface of the core. The core comprises a core polymer matrix within which is dispersed a drug compound having a molecular weight of about 0.5 kDa or more, the polymer matrix containing a hydrophobic polymer. Further, the membrane layer comprises a plurality of water-soluble particles distributed within a membrane polymer matrix containing an ethylene vinyl acetate copolymer, wherein the water-soluble particles have a D50 particle size of about 150 micrometers or less and contain a non-polymeric, hydroxy-functional compound.

38 Claims, 11 Drawing Sheets

(56) References Cited

U.S. PATENT DOCUMENTS

| | | | |
|---|---|---|---|
| 5,783,186 | A | 7/1998 | Arakawa et al. |
| 5,783,567 | A | 7/1998 | Hedley et al. |
| 5,795,587 | A | 8/1998 | Gao et al. |
| 5,827,525 | A | 10/1998 | Liao et al. |
| 5,858,388 | A | 1/1999 | Grossman et al. |
| 5,877,224 | A | 3/1999 | Brocchini et al. |
| 5,902,598 | A | 5/1999 | Chen et al. |
| 5,916,584 | A | 6/1999 | O'Donoghue et al. |
| 5,989,581 | A | 11/1999 | Groenewegen |
| 6,001,386 | A | 12/1999 | Ashton et al. |
| 6,083,534 | A | 7/2000 | Wallach et al. |
| 6,096,764 | A | 8/2000 | Bryant et al. |
| 6,117,441 | A | 9/2000 | Moo-Young et al. |
| 6,159,143 | A | 12/2000 | Lennox |
| 6,217,895 | B1 | 4/2001 | Guo et al. |
| 6,248,057 | B1 | 6/2001 | Mavity et al. |
| 6,262,034 | B1 | 7/2001 | Mathiowitz et al. |
| 6,281,015 | B1 | 8/2001 | Mooney et al. |
| RE37,410 | E | 10/2001 | Brem et al. |
| 6,331,313 | B1 | 12/2001 | Wong et al. |
| 6,344,035 | B1 | 2/2002 | Chudzik et al. |
| 6,375,972 | B1 | 4/2002 | Guo et al. |
| 6,423,345 | B2 | 7/2002 | Bernstein et al. |
| 6,459,917 | B1 | 10/2002 | Gowda |
| 6,471,993 | B1 | 10/2002 | Shastri et al. |
| 6,518,018 | B1 | 2/2003 | Szostak et al. |
| 6,544,546 | B1 | 4/2003 | Joseph Groenewegen et al. |
| 6,565,845 | B2 | 5/2003 | Cherksey et al. |
| 6,565,874 | B1 | 5/2003 | Dunn et al. |
| 6,572,874 | B1 | 6/2003 | Harrison et al. |
| 6,582,959 | B2 | 6/2003 | Kim |
| 6,620,617 | B2 | 9/2003 | Mathiowitz et al. |
| 6,672,874 | B2 | 1/2004 | Guthrie et al. |
| 6,689,390 | B2 | 2/2004 | Bernstein et al. |
| 6,703,020 | B1 | 3/2004 | Thorpe et al. |
| 6,713,081 | B2 | 3/2004 | Robinson et al. |
| 6,719,750 | B2 | 4/2004 | Varner et al. |
| 6,730,322 | B1 | 5/2004 | Bernstein et al. |
| 6,767,550 | B1 | 7/2004 | Génin et al. |
| 6,808,710 | B1 | 10/2004 | Wood et al. |
| 6,918,927 | B2 | 7/2005 | Bates et al. |
| 6,964,781 | B2 | 11/2005 | Brubaker |
| 6,984,720 | B1 | 1/2006 | Korman et al. |
| 6,991,808 | B2 | 1/2006 | Brubaker et al. |
| 7,005,454 | B2 | 2/2006 | Brocchini et al. |
| 7,014,861 | B2 | 3/2006 | Roorda et al. |
| 7,052,719 | B2 | 5/2006 | Bernstein et al. |
| 7,060,269 | B1 | 6/2006 | Baca et al. |
| 7,097,850 | B2 | 8/2006 | Chappa et al. |
| 7,115,256 | B1 | 10/2006 | Allen et al. |
| 7,169,901 | B2 | 1/2007 | Baca et al. |
| 7,189,461 | B2 | 3/2007 | Rabasco et al. |
| 7,195,774 | B2 | 3/2007 | Carvalho et al. |
| 7,288,638 | B2 | 10/2007 | Jure-Kunkel et al. |
| 7,309,689 | B2 | 12/2007 | Trigg et al. |
| 7,402,385 | B2 | 7/2008 | Dadachova et al. |
| 7,442,402 | B2 | 10/2008 | Chudzik et al. |
| 7,452,866 | B2 | 11/2008 | Thorn et al. |
| 7,488,802 | B2 | 2/2009 | Collins et al. |
| 7,531,503 | B2 | 5/2009 | Atala et al. |
| 7,534,449 | B2 | 5/2009 | Saltzman et al. |
| 7,594,899 | B2 | 9/2009 | Pinchuk et al. |
| 7,655,458 | B2 | 2/2010 | O'Reilly et al. |
| 7,659,384 | B2 | 2/2010 | Jure-Kunkel et al. |
| 7,666,445 | B2 | 2/2010 | Siegel et al. |
| 7,691,977 | B2 | 4/2010 | Fuh et al. |
| 7,708,711 | B2 | 5/2010 | Tu et al. |
| 7,736,665 | B2 | 6/2010 | Patel et al. |
| 7,763,277 | B1 | 7/2010 | Canham et al. |
| 7,803,178 | B2 | 9/2010 | Whirley et al. |
| 7,829,112 | B2 | 11/2010 | Ron et al. |
| 7,833,168 | B2 | 11/2010 | Taylor et al. |
| 7,833,545 | B2 | 11/2010 | Ron et al. |
| 7,833,548 | B2 | 11/2010 | Chappa et al. |
| 7,838,024 | B2 | 11/2010 | Ron et al. |
| 7,871,643 | B2 | 1/2011 | Lizio et al. |
| 7,883,718 | B2 | 2/2011 | Ron et al. |
| 7,901,707 | B2 | 3/2011 | Allen et al. |
| 7,989,018 | B2 | 8/2011 | McNiven et al. |
| 7,993,672 | B2 | 8/2011 | Huang et al. |
| 8,008,449 | B2 | 8/2011 | Korman et al. |
| 8,021,680 | B2 | 9/2011 | Anderson et al. |
| 8,039,010 | B2 | 10/2011 | Trogden et al. |
| 8,088,060 | B2 | 1/2012 | Cottone, Jr. et al. |
| 8,096,972 | B2 | 1/2012 | Varner et al. |
| 8,097,236 | B2 | 1/2012 | Aston et al. |
| 8,106,022 | B2 | 1/2012 | Monharan et al. |
| 8,119,154 | B2 | 2/2012 | Huang et al. |
| 8,137,667 | B2 | 3/2012 | Jure-Kunkel et al. |
| 8,147,865 | B2 | 4/2012 | Huang et al. |
| 8,168,757 | B2 | 5/2012 | Finnefrock et al. |
| 8,173,163 | B2 | 5/2012 | Kohn et al. |
| 8,182,464 | B2 | 5/2012 | Lee et al. |
| 8,197,839 | B2 | 6/2012 | Martinod et al. |
| 8,221,778 | B2 | 7/2012 | Siegel et al. |
| 8,232,313 | B2 | 7/2012 | Munn et al. |
| 8,236,857 | B2 | 8/2012 | Dill |
| 8,257,730 | B2 | 9/2012 | Huang et al. |
| 8,263,108 | B2 | 9/2012 | Gibson et al. |
| 8,263,110 | B2 | 9/2012 | Huang et al. |
| 8,268,314 | B2 | 9/2012 | Baehner et al. |
| 8,273,375 | B2 | 9/2012 | Lizio et al. |
| 8,298,565 | B2 | 10/2012 | Taylor et al. |
| 8,298,570 | B2 | 10/2012 | Huang et al. |
| 8,323,679 | B2 | 12/2012 | Ahmed et al. |
| 8,333,983 | B2 | 12/2012 | Groenewegen et al. |
| 8,348,877 | B2 | 1/2013 | Tu et al. |
| 8,354,509 | B2 | 1/2013 | Carven et al. |
| 8,377,062 | B2 | 2/2013 | Lutz et al. |
| 8,399,518 | B2 | 3/2013 | Morkin et al. |
| 8,426,554 | B2 | 4/2013 | Rozema et al. |
| 8,440,216 | B2 | 5/2013 | Huang et al. |
| 8,450,467 | B2 | 5/2013 | Manoharan et al. |
| 8,454,582 | B2 | 6/2013 | deJuan et al. |
| 8,465,769 | B2 | 6/2013 | Petereit et al. |
| 8,475,820 | B2 | 7/2013 | Kuzma et al. |
| 8,481,079 | B2 | 7/2013 | De Graaff et al. |
| 8,491,472 | B2 | 7/2013 | Mitelberg et al. |
| 8,496,954 | B2 | 7/2013 | Chappa et al. |
| 8,506,987 | B2 | 8/2013 | Shiah et al. |
| 8,541,028 | B2 | 9/2013 | Staas et al. |
| 8,552,157 | B2 | 10/2013 | Amatulli et al. |
| 8,568,766 | B2 | 10/2013 | Anantharamaiah et al. |
| 8,568,778 | B2 | 10/2013 | Lizio et al. |
| 8,580,735 | B2 | 11/2013 | Francois et al. |
| 8,609,089 | B2 | 12/2013 | Langermann et al. |
| 8,642,089 | B2 | 2/2014 | Petereit et al. |
| 8,647,657 | B2 | 2/2014 | Gibson et al. |
| 8,685,427 | B2 | 4/2014 | Li et al. |
| 8,697,104 | B2 | 4/2014 | Knezevich et al. |
| 8,703,130 | B2 | 4/2014 | Baehner et al. |
| 8,710,187 | B2 | 4/2014 | Binz et al. |
| 8,722,037 | B2 | 5/2014 | Veenstra et al. |
| 8,734,849 | B2 | 5/2014 | Lizio et al. |
| 8,741,329 | B2 | 6/2014 | de Graaff et al. |
| 8,747,883 | B2 | 6/2014 | Labib et al. |
| 8,750,988 | B2 | 6/2014 | Jolly et al. |
| 8,753,667 | B2 | 6/2014 | Variano et al. |
| 8,765,152 | B2 | 7/2014 | Lizio et al. |
| 8,765,166 | B2 | 7/2014 | Kopezynski et al. |
| 8,771,722 | B2 | 7/2014 | Huang et al. |
| 8,771,728 | B2 | 7/2014 | Huang et al. |
| 8,779,105 | B2 | 7/2014 | Korman et al. |
| 8,792,359 | B2 | 7/2014 | Mashino et al. |
| 8,795,242 | B2 | 8/2014 | Hoganson et al. |
| 8,795,707 | B2 | 8/2014 | Wolinsky et al. |
| 8,802,128 | B2 | 8/2014 | Robinson et al. |
| 8,802,773 | B2 | 8/2014 | Rozema et al. |
| 8,808,744 | B2 | 8/2014 | de Graaff et al. |
| 8,840,920 | B2 | 9/2014 | Nugara et al. |
| 8,852,623 | B2 | 10/2014 | Patel et al. |
| 8,858,977 | B2 | 10/2014 | Groenewegen et al. |
| 8,858,993 | B2 | 10/2014 | Gold et al. |
| 8,871,241 | B2 | 10/2014 | Chou et al. |

(56) References Cited

U.S. PATENT DOCUMENTS

| | | |
|---|---|---|
| 8,883,208 B2 | 11/2014 | McGonigle et al. |
| 8,889,174 B1 | 11/2014 | Gibson et al. |
| 8,900,587 B2 | 12/2014 | Carven et al. |
| 8,900,615 B2 | 12/2014 | Groenewegen et al. |
| 8,900,616 B2 | 12/2014 | Belcheva et al. |
| 8,901,076 B2 | 12/2014 | Binz et al. |
| 8,911,426 B2 | 12/2014 | Coppeta et al. |
| 8,911,427 B2 | 12/2014 | Seiler et al. |
| 8,932,346 B2 | 1/2015 | Kuehling et al. |
| 8,945,552 B2 | 2/2015 | Baehner et al. |
| 8,954,572 B2 | 2/2015 | Jenkins |
| 8,962,009 B2 | 2/2015 | Huang et al. |
| 8,962,010 B2 | 2/2015 | Woolfson et al. |
| 8,962,011 B2 | 2/2015 | Raspagliesi |
| 8,980,298 B2 | 3/2015 | Schwarz |
| 8,992,979 B2 | 3/2015 | Emanuel et al. |
| 8,999,390 B2 | 4/2015 | Petersen et al. |
| 9,066,782 B2 | 6/2015 | Tu et al. |
| 9,078,900 B2 | 7/2015 | Kuzma et al. |
| 9,107,899 B2 | 8/2015 | Furst et al. |
| 9,132,081 B2 | 9/2015 | Loxley |
| 9,132,088 B2 | 9/2015 | Sim et al. |
| 9,175,162 B2 | 11/2015 | Pacetti et al. |
| 9,198,947 B2 | 12/2015 | Hadwiger et al. |
| 9,249,179 B2 | 2/2016 | Hadwiger et al. |
| 9,289,466 B2 | 3/2016 | Binz et al. |
| 9,296,687 B2 | 3/2016 | George et al. |
| 9,301,926 B2 | 4/2016 | Indolfi et al. |
| 9,301,990 B2 | 4/2016 | Hadwiger et al. |
| 9,327,059 B2 | 5/2016 | Huang et al. |
| 9,345,686 B2 | 5/2016 | De Graaff |
| 9,370,444 B2 | 6/2016 | Cunningham, Jr. |
| 9,370,558 B2 | 6/2016 | Ali et al. |
| 9,370,582 B2 | 6/2016 | Manoharan et al. |
| 9,464,292 B2 | 10/2016 | Okumura et al. |
| 9,464,293 B2 | 10/2016 | Rossi et al. |
| 9,492,400 B2 | 11/2016 | Jon et al. |
| 9,493,728 B2 | 11/2016 | Berrido et al. |
| 9,533,047 B2 | 1/2017 | de Fougerolles et al. |
| 9,540,443 B2 | 1/2017 | Hadari et al. |
| 9,585,912 B2 | 3/2017 | Sherman et al. |
| 9,622,992 B2 | 4/2017 | Dalton et al. |
| 9,642,658 B2 | 5/2017 | Boyd et al. |
| 9,668,977 B2 | 6/2017 | Schattka et al. |
| 9,687,506 B2 | 6/2017 | Sherman et al. |
| 9,695,233 B2 | 7/2017 | Duerr et al. |
| 9,708,396 B2 | 7/2017 | Baehner et al. |
| 9,775,815 B2 | 10/2017 | Schattka et al. |
| 9,782,346 B2 | 10/2017 | Venkatraman et al. |
| 9,789,001 B2 | 10/2017 | Tu et al. |
| 9,796,756 B2 | 10/2017 | Hadwiger et al. |
| 9,808,420 B2 | 11/2017 | Kopczynski et al. |
| 9,814,671 B2 | 11/2017 | Lee |
| 9,814,777 B2 | 11/2017 | Manoharan et al. |
| 9,821,045 B2 | 11/2017 | Ali et al. |
| 9,844,511 B2 | 12/2017 | Nollenberger et al. |
| 9,849,158 B2 | 12/2017 | Binz et al. |
| 9,867,882 B2 | 1/2018 | Manoharan et al. |
| 9,872,829 B2 | 1/2018 | Loxley et al. |
| 9,872,912 B2 | 1/2018 | Chiou et al. |
| 9,894,643 B2 | 2/2018 | Moulsley |
| 9,895,318 B2 | 2/2018 | Joshi et al. |
| 9,896,576 B2 | 2/2018 | Zhang et al. |
| 9,931,330 B2 | 4/2018 | Zarnitsyn et al. |
| 9,956,172 B2 | 5/2018 | McGinity et al. |
| 9,968,647 B2 | 5/2018 | Hadwiger et al. |
| 9,987,233 B2 | 6/2018 | Helliwell et al. |
| 9,999,595 B2 | 6/2018 | Rakic et al. |
| 10,010,612 B2 | 7/2018 | Dadey et al. |
| 10,028,851 B2 | 7/2018 | Dugan et al. |
| 10,029,034 B2 | 7/2018 | Falotico et al. |
| 10,058,554 B2 | 8/2018 | Luk et al. |
| 10,098,836 B2 | 10/2018 | Csaky |
| 10,111,830 B2 | 10/2018 | Patel et al. |
| 10,111,838 B2 | 10/2018 | Joshi et al. |
| 10,123,971 B2 | 11/2018 | Patel et al. |
| 10,131,910 B2 | 11/2018 | Wyk |
| 10,144,762 B2 | 12/2018 | Weller et al. |
| 10,155,946 B2 | 12/2018 | Yehl et al. |
| 10,196,445 B1 | 2/2019 | Engelhardt et al. |
| 10,226,419 B2 | 3/2019 | Arps et al. |
| 10,286,197 B2 | 5/2019 | Pouliot et al. |
| 10,413,504 B2 | 9/2019 | de Graaff et al. |
| 10,413,612 B2 | 9/2019 | Goldberg et al. |
| 10,414,828 B2 | 9/2019 | Gschwind et al. |
| 10,434,063 B2 | 10/2019 | McGinity et al. |
| 10,435,469 B2 | 10/2019 | Goldberg et al. |
| 10,449,145 B2 | 10/2019 | Csaky |
| 10,548,766 B2 | 2/2020 | Cuevas |
| 10,568,949 B2 | 2/2020 | Ali et al. |
| 10,590,193 B2 | 3/2020 | Borras et al. |
| 10,596,103 B2 | 3/2020 | Aarts et al. |
| 10,624,862 B2 | 4/2020 | Wening et al. |
| 10,625,440 B2 | 4/2020 | Morrissette |
| 10,625,444 B2 | 4/2020 | Teffrer et al. |
| 10,639,283 B2 | 5/2020 | Haksar et al. |
| 10,646,542 B2 | 5/2020 | Binz et al. |
| 10,653,621 B2 | 5/2020 | Wu et al. |
| 10,654,922 B2 | 5/2020 | Lu et al. |
| 10,682,400 B2 | 6/2020 | Ali et al. |
| 10,683,345 B2 | 6/2020 | Duerr et al. |
| 10,702,551 B2 | 7/2020 | Stephan |
| 10,806,791 B2 | 10/2020 | Manoharan et al. |
| 10,835,604 B2 | 11/2020 | Ngwa et al. |
| 10,836,826 B2 | 11/2020 | Goldberg et al. |
| 10,869,833 B2 | 12/2020 | Kopczynski et al. |
| 10,874,768 B2 | 12/2020 | Morgan et al. |
| 10,875,921 B2 | 12/2020 | Akamatsu et al. |
| 10,881,609 B2 | 1/2021 | Csaky |
| 10,913,947 B2 | 2/2021 | Aznarez et al. |
| 11,021,539 B2 | 6/2021 | Goldberg et al. |
| 11,110,174 B2 | 9/2021 | Manoharan et al. |
| 11,116,776 B2 | 9/2021 | Williams et al. |
| 11,161,916 B2 | 11/2021 | Gschwind et al. |
| 11,242,395 B2 | 2/2022 | Luo et al. |
| 11,324,935 B2 | 5/2022 | Munster et al. |
| 11,666,653 B2 | 6/2023 | Manoharan et al. |
| 11,690,806 B2 | 7/2023 | Schneider |
| 11,690,807 B2 | 7/2023 | Schneider |
| 11,746,147 B2 | 9/2023 | Lu et al. |
| 2002/0081556 A1 | 6/2002 | Tseng et al. |
| 2003/0149008 A1 | 8/2003 | Sahadevan |
| 2003/0152625 A1 | 8/2003 | Groenewegen et al. |
| 2003/0203000 A1 | 10/2003 | Schwarz et al. |
| 2004/0092534 A1 | 5/2004 | Yam et al. |
| 2004/0121014 A1 | 6/2004 | Guo et al. |
| 2004/0146516 A1 | 7/2004 | Roben et al. |
| 2004/0157244 A1 | 8/2004 | Budahazi et al. |
| 2004/0192598 A1 | 9/2004 | Kragie |
| 2004/0224000 A1 | 11/2004 | Deghenghi |
| 2004/0262223 A1 | 12/2004 | Strook et al. |
| 2005/0031668 A1 | 2/2005 | Patel et al. |
| 2005/0137537 A1 | 6/2005 | Watson et al. |
| 2005/0163844 A1 | 7/2005 | Ashton |
| 2005/0220895 A1 | 10/2005 | Bucalo et al. |
| 2005/0244462 A1 | 11/2005 | Farooq |
| 2006/0003008 A1 | 1/2006 | Gibson et al. |
| 2006/0052757 A1 | 3/2006 | Fischer, Jr. et al. |
| 2006/0089410 A1 | 4/2006 | Bucalo et al. |
| 2006/0141049 A1 | 6/2006 | Lyons et al. |
| 2006/0147437 A1 | 7/2006 | Allen et al. |
| 2006/0160745 A1 | 7/2006 | Igari et al. |
| 2006/0188543 A1 | 8/2006 | Feng |
| 2007/0043332 A1 | 2/2007 | Malcolm et al. |
| 2007/0128294 A1 | 6/2007 | Bucalo et al. |
| 2007/0134332 A1 | 6/2007 | Turnell et al. |
| 2007/0179097 A1 | 8/2007 | Furuya et al. |
| 2007/0231406 A1 | 10/2007 | Bucalo et al. |
| 2007/0248637 A1 | 10/2007 | Chappa et al. |
| 2007/0253959 A1 | 11/2007 | Ferrara et al. |
| 2007/0260203 A1 | 11/2007 | Donello et al. |
| 2007/0275031 A1 | 11/2007 | Patel et al. |
| 2007/0282425 A1 | 12/2007 | Kleine et al. |
| 2008/0145406 A1 | 6/2008 | Asgharian et al. |

(56) References Cited

U.S. PATENT DOCUMENTS

| | | | |
|---|---|---|---|
| 2008/0166391 A1 | 7/2008 | Gibson et al. | |
| 2008/0181900 A1 | 7/2008 | Ferrara et al. | |
| 2008/0241218 A1 | 10/2008 | McMorrow et al. | |
| 2008/0299168 A1 | 12/2008 | Dadey et al. | |
| 2009/0011007 A1 | 1/2009 | Meier et al. | |
| 2009/0035381 A1 | 2/2009 | Stankus et al. | |
| 2009/0092650 A1 | 4/2009 | Warren et al. | |
| 2009/0104243 A1 | 4/2009 | Utkhede et al. | |
| 2009/0117168 A1 | 5/2009 | Keenan | |
| 2009/0130176 A1 | 5/2009 | Bossy-Nobs et al. | |
| 2009/0142313 A1 | 6/2009 | Talling et al. | |
| 2009/0169556 A1 | 7/2009 | Ferrara et al. | |
| 2009/0173906 A1 | 7/2009 | Park et al. | |
| 2009/0239814 A1 | 9/2009 | Manoharan et al. | |
| 2009/0247608 A1 | 10/2009 | Manoharan et al. | |
| 2009/0280155 A1 | 11/2009 | Chappa et al. | |
| 2009/0311304 A1 | 12/2009 | Borck et al. | |
| 2010/0015218 A1 | 1/2010 | Jadhav et al. | |
| 2010/0047306 A1 | 2/2010 | Loeffler et al. | |
| 2010/0051575 A1 | 3/2010 | Ou | |
| 2010/0104619 A1 | 4/2010 | De Graaff et al. | |
| 2010/0111967 A1 | 5/2010 | Baehner et al. | |
| 2010/0119523 A1 | 5/2010 | Ferrara et al. | |
| 2010/0158799 A1 | 6/2010 | Chudzik et al. | |
| 2010/0158980 A1 | 6/2010 | Kopczynski et al. | |
| 2010/0203066 A1 | 8/2010 | Zhao et al. | |
| 2010/0203104 A1 | 8/2010 | De Graff et al. | |
| 2010/0268288 A1* | 10/2010 | Hunter | A61N 1/05 607/3 |
| 2010/0273254 A1 | 10/2010 | Budahazi et al. | |
| 2010/0278725 A1 | 11/2010 | Liu et al. | |
| 2010/0285097 A1 | 11/2010 | Talling et al. | |
| 2010/0303883 A1 | 12/2010 | Pollock et al. | |
| 2010/0316652 A1 | 12/2010 | Ferrara et al. | |
| 2011/0038936 A1 | 2/2011 | Griswold et al. | |
| 2011/0045076 A1 | 2/2011 | Kiser et al. | |
| 2011/0105990 A1 | 5/2011 | Silvestrini | |
| 2011/0207668 A1 | 8/2011 | Binz et al. | |
| 2011/0230963 A1 | 9/2011 | Cuevas | |
| 2011/0236388 A1 | 9/2011 | Baehner et al. | |
| 2011/0280922 A1 | 11/2011 | Ron et al. | |
| 2011/0287024 A1 | 11/2011 | Ferrara et al. | |
| 2012/0029042 A1 | 2/2012 | King | |
| 2012/0078362 A1 | 3/2012 | Haffner et al. | |
| 2012/0136042 A1 | 5/2012 | Manoharan et al. | |
| 2012/0157509 A1 | 6/2012 | Hadwiger et al. | |
| 2012/0164193 A1 | 6/2012 | Dill | |
| 2012/0172412 A1 | 7/2012 | Rozema et al. | |
| 2012/0207682 A1 | 8/2012 | Ashton | |
| 2012/0225129 A1 | 9/2012 | Eliasof et al. | |
| 2012/0226224 A1* | 9/2012 | Petersen | A61P 35/00 424/490 |
| 2012/0268288 A1 | 10/2012 | Cousin et al. | |
| 2012/0276209 A1 | 11/2012 | Cullis et al. | |
| 2012/0277852 A1 | 11/2012 | Shukia et al. | |
| 2012/0302622 A1 | 11/2012 | Eliasof et al. | |
| 2012/0321627 A1 | 12/2012 | Baehner et al. | |
| 2013/0028911 A1 | 1/2013 | Ferrara et al. | |
| 2013/0037977 A1 | 2/2013 | Burke et al. | |
| 2013/0078248 A1 | 3/2013 | Gschwind et al. | |
| 2013/0116197 A1 | 5/2013 | Binz et al. | |
| 2013/0122096 A1 | 5/2013 | Shemi et al. | |
| 2013/0156845 A1 | 6/2013 | Manoharan et al. | |
| 2013/0178512 A1 | 7/2013 | Manoharan et al. | |
| 2013/0190484 A1 | 7/2013 | Rozema et al. | |
| 2013/0195951 A1 | 8/2013 | Patel et al. | |
| 2013/0202673 A1 | 8/2013 | Patel et al. | |
| 2013/0218081 A1 | 8/2013 | Roth | |
| 2013/0273137 A1 | 10/2013 | Mandell et al. | |
| 2013/0287688 A1 | 10/2013 | Jain et al. | |
| 2013/0316001 A1 | 11/2013 | Popov et al. | |
| 2014/0037746 A1 | 2/2014 | Ashton et al. | |
| 2014/0044738 A1 | 2/2014 | Langermann et al. | |
| 2014/0086995 A1 | 3/2014 | Ratner et al. | |
| 2014/0088131 A1 | 3/2014 | Patel et al. | |
| 2014/0094407 A1 | 4/2014 | Ron et al. | |
| 2014/0127228 A1 | 5/2014 | Marks et al. | |
| 2014/0135381 A1 | 5/2014 | Hadwiger et al. | |
| 2014/0179761 A1 | 6/2014 | Manoharan et al. | |
| 2014/0209100 A1 | 7/2014 | Kiser et al. | |
| 2014/0212355 A1 | 7/2014 | Trollsas et al. | |
| 2014/0221295 A1 | 8/2014 | Binz et al. | |
| 2014/0234381 A1 | 8/2014 | Tao et al. | |
| 2014/0234389 A1 | 8/2014 | Shiah et al. | |
| 2014/0271765 A1 | 9/2014 | Patel | |
| 2014/0296322 A1 | 10/2014 | Eliasof et al. | |
| 2014/0314966 A1 | 10/2014 | Fink et al. | |
| 2014/0328884 A1 | 11/2014 | Reyes et al. | |
| 2014/0343080 A1 | 11/2014 | Siegel et al. | |
| 2014/0363484 A1 | 12/2014 | Koyakutty et al. | |
| 2014/0377276 A1 | 12/2014 | Ferrara et al. | |
| 2015/0004166 A1 | 1/2015 | Baehner et al. | |
| 2015/0004213 A1 | 1/2015 | Ron | |
| 2015/0011615 A1 | 1/2015 | Manoharan et al. | |
| 2015/0119444 A1 | 4/2015 | Manoharan et al. | |
| 2015/0140062 A1 | 5/2015 | Shiah et al. | |
| 2015/0190348 A1 | 7/2015 | Haksar et al. | |
| 2015/0191535 A1 | 7/2015 | Baehner et al. | |
| 2015/0199445 A1 | 7/2015 | Abajian et al. | |
| 2015/0202076 A1 | 7/2015 | Wijzen | |
| 2015/0209440 A1 | 7/2015 | Eliasof et al. | |
| 2015/0209488 A1 | 7/2015 | Siegel et al. | |
| 2015/0230971 A1 | 8/2015 | Wildemeersch | |
| 2015/0274640 A1 | 10/2015 | Wardell et al. | |
| 2015/0297509 A1 | 10/2015 | Schwarz | |
| 2015/0306230 A1 | 10/2015 | Combs et al. | |
| 2015/0342894 A1 | 12/2015 | Anderson | |
| 2015/0344539 A1 | 12/2015 | Binz et al. | |
| 2015/0366825 A1 | 12/2015 | Joshi et al. | |
| 2016/0008399 A1 | 1/2016 | Stephan | |
| 2016/0022571 A1 | 1/2016 | Schwarz et al. | |
| 2016/0051691 A1 | 2/2016 | Manoharan et al. | |
| 2016/0067071 A1 | 3/2016 | Jose et al. | |
| 2016/0081933 A1 | 3/2016 | Hensel et al. | |
| 2016/0102120 A1 | 4/2016 | Hadwiger et al. | |
| 2016/0130348 A1 | 5/2016 | Langermann et al. | |
| 2016/0143844 A1 | 5/2016 | Carrasquillo et al. | |
| 2016/0206633 A1 | 7/2016 | Barth et al. | |
| 2016/0263185 A1 | 9/2016 | Binz et al. | |
| 2016/0289677 A1 | 10/2016 | Albaek et al. | |
| 2016/0302965 A1 | 10/2016 | Erickson et al. | |
| 2016/0375137 A9 | 12/2016 | Manoharan et al. | |
| 2017/0022505 A1 | 1/2017 | Hadwiger et al. | |
| 2017/0043152 A1 | 2/2017 | Bizup | |
| 2017/0121513 A1 | 5/2017 | Zhang et al. | |
| 2017/0135380 A1 | 5/2017 | Stewart et al. | |
| 2017/0240626 A1 | 8/2017 | Baehner et al. | |
| 2017/0246117 A1 | 8/2017 | Helliwell et al. | |
| 2017/0247475 A1 | 8/2017 | Gschwind et al. | |
| 2017/0369566 A1 | 12/2017 | Baehner et al. | |
| 2018/0049988 A1* | 2/2018 | Chapanian | A61P 35/00 |
| 2018/0085474 A1 | 3/2018 | Almarsson et al. | |
| 2018/0125780 A1 | 5/2018 | Grattoni et al. | |
| 2018/0125932 A1 | 5/2018 | Binz et al. | |
| 2018/0140556 A1 | 5/2018 | Joshi et al. | |
| 2018/0171386 A1 | 6/2018 | Parekkadan et al. | |
| 2018/0214507 A1 | 8/2018 | Kacker et al. | |
| 2018/0256606 A1 | 9/2018 | Petereit et al. | |
| 2018/0280194 A1 | 10/2018 | Heitzmann et al. | |
| 2018/0326070 A1 | 11/2018 | Manoharan et al. | |
| 2018/0333296 A1 | 11/2018 | Heitzmann et al. | |
| 2019/0046434 A1 | 2/2019 | Mota Leite Machado Mariz et al. | |
| 2019/0099493 A1 | 4/2019 | Manoharan et al. | |
| 2019/0112354 A1 | 4/2019 | Forsayeth et al. | |
| 2019/0142882 A1 | 5/2019 | Shepherd et al. | |
| 2019/0184018 A1 | 6/2019 | Manoharan et al. | |
| 2019/0184145 A1 | 6/2019 | Munster et al. | |
| 2019/0307885 A1 | 10/2019 | Zugates et al. | |
| 2019/0345503 A1 | 11/2019 | Chang et al. | |
| 2019/0358166 A1 | 11/2019 | Schneider | |
| 2019/0358167 A1* | 11/2019 | Schneider | A61K 38/4873 |
| 2019/0382492 A1* | 12/2019 | Goldberg | A61P 35/04 |
| 2020/0000976 A1 | 1/2020 | Jeffery | |

(56) References Cited

U.S. PATENT DOCUMENTS

| | | |
|---|---|---|
| 2020/0010569 A1 | 1/2020 | Gschwind et al. |
| 2020/0093852 A1 | 3/2020 | Nelms et al. |
| 2020/0113829 A1 | 4/2020 | Chang et al. |
| 2020/0138707 A1 | 5/2020 | McGinity et al. |
| 2020/0138729 A1 | 5/2020 | Schwartz et al. |
| 2020/0179374 A1 | 6/2020 | Orefice et al. |
| 2020/0197327 A1 | 6/2020 | Wening et al. |
| 2020/0297853 A1 | 9/2020 | Manoharan et al. |
| 2020/0316159 A1 | 10/2020 | Ghatnekar |
| 2020/0353062 A1 | 11/2020 | Sammatur et al. |
| 2021/0007973 A1 | 1/2021 | Patel et al. |
| 2021/0047394 A1 | 2/2021 | Baehner et al. |
| 2021/0069293 A1 | 3/2021 | Binz et al. |
| 2021/0095013 A1 | 4/2021 | Duerr et al. |
| 2021/0113664 A1 | 4/2021 | Patel et al. |
| 2021/0155782 A1 | 5/2021 | Blasius et al. |
| 2021/0177742 A1 | 6/2021 | Patel |
| 2022/0008541 A1 | 1/2022 | Manoharan et al. |
| 2022/0017642 A1 | 1/2022 | Gschwind et al. |
| 2022/0143189 A1 | 5/2022 | Manoharan et al. |
| 2022/0313616 A1 | 10/2022 | Haley et al. |
| 2022/0313725 A1 | 10/2022 | Haley et al. |
| 2023/0027209 A1 | 1/2023 | Haley et al. |
| 2023/0047191 A1 | 2/2023 | Wilson et al. |
| 2023/0092955 A1 | 3/2023 | Gyanani et al. |
| 2023/0104358 A1 | 4/2023 | Gyanani et al. |
| 2023/0149298 A1 | 5/2023 | Patel et al. |
| 2023/0212277 A1 | 7/2023 | Duerr et al. |
| 2023/0233375 A1 | 7/2023 | Patel et al. |
| 2023/0233455 A1 | 7/2023 | Patel et al. |
| 2023/0263724 A1 | 8/2023 | Haley et al. |
| 2023/0277469 A1 | 9/2023 | Schneider |
| 2023/0277470 A1 | 9/2023 | Schneider |
| 2023/0285276 A1 | 9/2023 | Haley et al. |
| 2023/0364009 A1 | 11/2023 | Haley et al. |
| 2023/0404907 A1 | 12/2023 | Haley et al. |
| 2024/0091140 A1 | 3/2024 | Quinci et al. |
| 2024/0180463 A1 | 6/2024 | Haley et al. |
| 2024/0245615 A1 | 7/2024 | Schneider |
| 2024/0269065 A1 | 8/2024 | Haley et al. |
| 2025/0101417 A1 | 3/2025 | Haley et al. |

FOREIGN PATENT DOCUMENTS

| | | |
|---|---|---|
| CN | 101011345 A | 8/2007 |
| CN | 101385698 A | 3/2009 |
| CN | 103435424 B | 3/2016 |
| CN | 112315898 A | 2/2021 |
| DE | 102013011399 A1 | 2/2014 |
| EP | 0 290 891 A1 | 11/1988 |
| EP | 2 265 293 B1 | 11/2015 |
| JP | H 10230148 A | 9/1998 |
| KR | 20210010226 A | 1/2021 |
| UA | 103635 C2 | 11/2013 |
| WO | WO 94/10202 A1 | 5/1994 |
| WO | WO 94/23738 A1 | 10/1994 |
| WO | WO 98/45332 A2 | 10/1998 |
| WO | WO 2000/075319 A1 | 12/2000 |
| WO | WO 01/47490 A1 | 7/2001 |
| WO | WO02062352 A2 | 8/2002 |
| WO | WO 2004/044141 A2 | 5/2004 |
| WO | WO 2006/063242 A1 | 6/2006 |
| WO | WO 2009/129459 A1 | 10/2009 |
| WO | WO 2010/133757 A1 | 11/2010 |
| WO | WO 2010/133761 A1 | 11/2010 |
| WO | WO 2011/116132 A1 | 9/2011 |
| WO | WO 2011/126937 A1 | 10/2011 |
| WO | WO 2013/178811 A1 | 12/2013 |
| WO | WO 2013/178812 A1 | 12/2013 |
| WO | WO 2014/009465 A1 | 1/2014 |
| WO | WO 2014/160026 A2 | 10/2014 |
| WO | WO 2015/083978 A1 | 6/2015 |
| WO | WO 2016/064959 A1 | 4/2016 |
| WO | WO 2016/079204 A1 | 5/2016 |
| WO | WO 2016/180764 A1 | 11/2016 |
| WO | WO 2017/040855 A1 | 3/2017 |
| WO | WO 2017/197199 A1 | 11/2017 |
| WO | WO 2018/067882 A1 | 4/2018 |
| WO | WO 2019/154776 A1 | 8/2019 |
| WO | WO 2019/213128 A1 | 11/2019 |
| WO | WO 2020/006240 A1 | 1/2020 |
| WO | WO 2020/041500 A1 | 2/2020 |
| WO | 2020/081622 A1 | 4/2020 |
| WO | WO 2020/081633 A1 | 4/2020 |
| WO | WO 2020/198737 A1 | 10/2020 |
| WO | WO2021122822 A1 | 6/2021 |

OTHER PUBLICATIONS

Abstract of Almeida, A. et al., "Sustained release from hot-melt extruded matrices based on ethylene vinyl acetate and polyethylene oxide," *European Journal of Pharmaceutics and Biopharmaceutics*, vol. 82, Issue 3, Nov. 2012, pp. 526-533.

Abstract of Bacus, S. et al., :Differentiation of cultured human breast cancer cell (AU-565 and MCF-7_associated with loss of cell surface HER-2/neu antigen. *Molecular Carinogenesis* vol. 3, Issue 6.1990. 7 pages.

Abstract—Patel et al. ; Ethylene-vinyl acetate (EVA) based implant for ocular inflammation. *Invest. Ophthalmol. Vis. Sci.* 2022;63(7):4154-F0146.

Abstract—Tagliabue et al., "Selection of monoclonal antibodies which induce internalization and phosphorylation of p185HER2 and grown inhibition of cells with HER2/NEU gene amplification," Int. J Cancer. Apr. 1, 1991;47(6):933-7, 1 page.

Agarwal et al., "Injectable implants for the sustained release of protein and peptide drugs," *Drug Discovery Today*, vol. 18, Nos. 7/8, Apr. 2013, pp. 337-349.

Ahmed et al., "Recent Advances in Polymeric Implants," *AAPS PharmSciTech*, (2019) 20: 300, 10 pages.

Arteaga, et al. p185c-erbB-2 Signaling Enhances Cisplatin-induced Cytotoxicity in Humab Breast Carcinoma Cells: Association between an Ongenic Receptor Tyrosine Kinase and Grud-induced DNA repair. *Cancer Research* 54, pp. 3758-3765, Jul. 15, 1994.

Bacus, S. et al. "Tumor-inhibitory Monoclonal Antibodies to the HER-2/Neu Receptor Induce Differentiation of Human Breast Cancer Cells." *Cancer Research* 52, pp. 2580-2589, May 1, 1992.

Bausch & Lomb Inc., "Vitrasert," Jan. 13, 2005. 22 pages.

Bix et al., "Elvax as a slow-release delivery agent for a platelet-activating factor receptor agonist and antagonist," *Journal of Neuroscience Methods*, 77, 1997, pp. 67-74.

Bloch et al., "Nerve Growth Factor- and Neurotrophin-3-Releasing Guidance Channels Promote Regeneration of the Transected Rat Dorsal Root," *Experimental Neurology* 172, 2001, pp. 425-432.

Boyer et al., "Relative Cytotoxic Activity of Immunotoxins Reactive with Different Epitopes on the Extracellular Domain of the c-erbB-2 (HER-2/neu) Gene Product p185," *Int. J. Cancer*: 82, 1999, pp. 525-531.

Broudy et al. Isolation and Characterization of a Monoclonal Antibody that Recognizes the Human c-kit Receptor. *The American Society of Hematology*. 1992. 9 pages.

Datasheet for Dexamethasone from Hello Bio, Inc., 2 pages.

Daukss et al., "Microscale implantable drug delivery systems: emerging IP strategies," *News & Analysis Biobusiness Briefs*, Nature Reviews, Drug Discovery, Nov. 2016, vol. 15, pp. 740-741.

Doughty et al., "Short Communication—Neurotrophin-3 promotes cerebellar granulate cell exit from the EGL." *European Journal of Neuroscience*, vol. 10, 1998, pp. 3007-3011.

DOW Product Information for ELVAX™ EVS copolymer resins grade selection guide from The Dow Chemical Company, 2020, 4 pages.

Feng et al., "Twin-screw extrusion of sustained-release oral dosage forms and medical implants," *Drug Delivery and Translations Research*, 2018, 8, pp. 1694-1713.

Gadd et al. A Murine Monoclonal Antibody Specific for a cell-surface antigen expressed by a sub-group of human myeloid leukemias. Leukemia Research vol. 9, No. 11, pp. 1329-1336. Feb. 12, 1985.

(56) References Cited

OTHER PUBLICATIONS

Garcia-Estrada, "Polymeric Implants for the Treatment of the Intraocular Eye Diseases: Trends in Biodegradable and Non-Biodegradable Materials," *Pharmaceutics* 2021, 13, 701, 20 pages.

Hancock, et al. "A Monoclonal Antibody against the c-erbB-2 Protein Enhances the Cytotoxicity of cis-Diamminedichloroplatinum against Human Breast and Ovarian Tumor Cell Lines." *Cancer Research* 51, pp. 4575-4580, Sep. 1, 1991.

Harwerth, et al. Monoclonal Antibodies against the Extracellular Domain of the erbB-2 Receptor Function as Partial Ligand Agonists. *The Journal of Biological Chemistry* vol. 267, No. 21, Issue of Jul. 25, pp. 15160-15167, 1992.

Jong et al., "Controlled release of plasmid DNA," *Journal of Controlled Release*, Release 47, 1997, pp. 123-134.

Kasprzyl, et a;. "Therapy of an Animal Model of Human Gastric Cancer Using a Combination of Anti-erbB-2 Monoclonal Antibodies." *Cancer Research* 52, pp. 2771-2776, May 15, 1992.

Kimball et al., "A novel approach to administration of peptides in women: Systemic absorption of a GnRH agonist vial transvaginal ring delivery system," *Journal of Controlled Release 233*, 2016, pp. 19-28.

Kindblom et al. Gastrointestinal Stromal Tumors Show Phenotypic Characteristics of the Interstitial Cells of Cajal. *American Journal of Pathology*, vol. 152, No. 5, May 1998. pp. 1-11.

Klapper et al. "A subclass of tumor-inhibitory monoclonal antibodies to ErbB-2/HER2 blocks crosstalk with growth factor receptors." *Oncogene* (1997) 14, pp. 2099 2109.

Kucinaks-Lipka, "Polyurethanes Crosslinked with Poly(vinyl alcohol) as a Slowly-Degradable and Hydrophilic Materials of Potential Use in Regenerative Medicine," *Materials*, 2018, 11, 351, 19 pages.

Kuo-Haller et al., "Vaccine delivery by polymeric vehicles in the mouse reproductive tract induce sustained local and systemic immunity," Mol. Pharm., Oct. 4, 2010, 7(5), pp. 1585-1595.

Langer et al., "Polymers for the sustained release of proteins and other macromolecules," *Nature*, vol. 263, pp. 797-800.

Loxley, Andrew, "Hot Melt-Extrusion in the Production of Intravaginal Rings Containing Antiretroviral Drugs," *ANTEC 2010*, May 18, 2010, 28 pages.

Maier et al., Requirements for the Internalization of a Murine Monoclonal Antibody Directed against the HER-2/neu Gene Product c-erbB-2.*Cancer Research* 51, 5361-5369, Oct. 1, 1991. 9 pages.

Master Dissertation of Pharm. Kristof Dhaenens entitled "Ethylene Vinyl Acetate as Matrix for Oral Sustained Release Multiple-Unit Dosage Forms Produced via Hot-Melt Extrusion," 2009-2010, Universiteit Gent, Department of Pharmaceutics, 61 pages.

McKenzie et al. Generation and characterization of monoclonal antibodies specific for the human neu oncogene products, p. 185. *Oncogene*, May 1, 1989, 4(5):543-548.

Overview of materials for Ethylene Vinyl Acetate Copolymer (EVA), Film Grade, www.matweb.com/search/datasheet, 2011, 2 pages.

Pan et al., "New paradigms on siRNA local application," *BMB Reports 2015*, pp. 147-152.

Paper—Stanković et al., "Polymeric formulations for drug release prepared by Hot Melt Extrusion, Application and characterization," pp. 16-49.

Preis et al., "Short Communication—A Single-Step Immunization by Sustained Antigen Release," *Journal of Immunological Methods*, 28, 1979, pp. 193-197.

Ramgopal et al., "Sustained Release of Complexed and Naked DNA from Polymer Films," *Journal of Biomedical Materials Research Part B: Applied Biomaterials*, 2007, pp. 496-503.

Rinaldi et al., "Antisense oligonucleotides: the next frontier for treatment of neurological disorders," *Nature Reviews/Neurology*, 2017, pp. 1-13.

Saltzman et al., "Intracranial Delivery of Recombinant Nerve Growth Factor: Release Kinetics and Protein Distribution for Three Delivery Systems," *Pharmaceutical Research*, vol. 16, No. 2, 1999, pp. 232-240.

Saltzman et al., "Transport rates of proteins in porous materials with known microgeometry," *Biophys. J.* (*Biophysical Society*), vol. 55, Jan. 1989, pp. 163-171.

Schneider et al., "Applications of ethylene vinyl acetate copolymers (EVA) in drug delivery systems," *Journal of Controlled Release* 262, 2017, pp. 284-295.

Shawver, et al. Ligand-like Effects Induced by Anti-c-erbB-2 Antibodies Do Not Correlate with and Are Not Required for Growth Inhibition of Human Carcinoma Cells. *Cancer Research* 54, pp. 1367-1373, Mar. 1, 1994.

Shin et al., "Controlled release of triprolidine using ethylene-vinyl acetate membrane and matrix systems," *European Journal of Pharmaceutics and Biopharmaceutics 54*, May 5, 2002, pp. 201-206.

Stancovski, I. et al. "Mechanistic aspects of the opposing effects of monoclonal antibodies to the ERBB2 receptor on tumor growth." *Proc. Natl. Acad. Sci. USA.* vol. 88, pp. 8691-8695, Oct. 1991.

Wadhwa et al., "Opportunities and Challenges in the Delivery of mRNA-Based Vaccines," Pharmaceutics, 2020, 12, 102, pp. 1-27.

Xu et al. "Antibody-induced growth inhibition is mediated through immunochemically and functionally distinct epitopes on the extracellular domain of the c-erbb-2 (her-2/neu) gene product p. 185." Feb. 1, 1993. *International Journal of Cancer*. vol. 53, Issue 3.

Zeng et al., "Formulation and Delivery Technologies for mRNA Vaccines," *Curr Top Microbiol Immunol.*, 2022, 440, Dec. 2, 2021, pp. 1-37.

International Search Report and Written Opinion for PCT/US2022/025688 dated Jul. 7, 2022, 12 pages.

Related Application Form.

Elvax 760, obtained from WayBack Machine https://web.archive.org/web/20210122035942/https://www.dow.com/en-us/pdp.elvax-760-ethylene-vinyl-acelate-copolymer:1893165z.html#properties on May 15, 2024, published Jan. 22, 2021.

Product Information Celanese Ateva® 4030AC Ethylene Vinyl Acetate Copolymer, 2024, 1 page (https://www.matweb.com/search/datasheet_print.aspx?matguid+bf54a0156c394074b9cf703fea6e4).

Koutsamanis et al., "Controlled-Release from High-Loaded Reservoir-Type Systems—A Case Study of Ethylene-Vinyl Acetate and Progesterone." *Pharmaceutics*, 2020, 12, 19 pages.

* cited by examiner

IMPLANTABLE DEVICE FOR SUSTAINED RELEASE OF A MACROMOLECULAR DRUG COMPOUND

RELATED APPLICATIONS

The present application is based upon and claims priority to U.S. Provisional Patent Application Ser. No. 63/179,620, having a filing date of Apr. 26, 2021; U.S. Provisional Patent Application Ser. No. 63/252,287, having a filing date of Oct. 5, 2021; U.S. Provisional Patent Application Ser. No. 63/300,767, having a filing date of Jan. 19, 2022; and U.S. Provisional Patent Application Ser. No. 63/311,517, having a filing date of Feb. 18, 2022, which are incorporated herein by reference.

BACKGROUND OF THE INVENTION

Biologic macromolecule drug compounds are typically composed of one or more oligomeric or polymeric chains, forming a three-dimensional structure held together by non-covalent forces. While these drug compounds have the potential for a multitude of therapeutic benefits, it has been traditionally difficult to controllably deliver these compounds over a sustained period of time. Many implantable delivery devices, for example, are formed by solubilizing a drug compound into a matrix polymer. These solubilized drug molecules can diffuse through the implant and be released into a patient. Unfortunately, however, drug elution is highly dependent upon the diffusion coefficient of the drug molecule, which in turn, is inversely proportional to the molecular weight of the drug molecule. Thus, macromolecular drug compounds tend to have a lower diffusion coefficient due to their larger molecular weight. Further, such compounds often have chain length entanglements, which can even further reduce the effective diffusion coefficient. In light of these difficulties, a need continues to exist for an implantable delivery device that is capable of delivering a macromolecular compound in effective amounts over a sustained period of time.

SUMMARY OF THE INVENTION

In accordance with one embodiment of the present invention, an implantable device for delivery of a macromolecular drug compound is disclosed. The device comprises a core having an outer surface and a membrane layer positioned adjacent to the outer surface of the core. The core comprises a core polymer matrix within which is dispersed a drug compound having a molecular weight of about 0.5 kDa or more, the polymer matrix containing a hydrophobic polymer. Further, the membrane layer comprises a plurality of water-soluble particles distributed within a membrane polymer matrix containing an ethylene vinyl acetate copolymer, wherein the water-soluble particles have a D50 particle size of about 150 micrometers or less and contain a non-polymeric, hydroxy-functional compound.

In accordance with another embodiment of the present invention, a polymer composition for use in a drug delivery device is disclosed. The composition comprises from about 50 wt. % to about 99 wt. % of a polymer matrix that contains an ethylene vinyl acetate copolymer and from about 1 wt. % to about 50 wt. % of a plurality of water-soluble particles distributed within the polymer matrix, wherein the ethylene vinyl acetate copolymer has a vinyl acetate monomer content of from about 25 wt. % to about 50 wt. %, a melt flow index of from about 10 to about 80 grams per 10 minutes as determined in accordance with ASTM D1238-20 at a temperature of 190° C. and a load of 2.16 kilograms, and/or a melting temperature of from about 60° C. to about 120° C. as determined in accordance with ASTM D3418-15. Further, the water-soluble particles have a D50 particle size of about 150 micrometers or less and contain a non-polymeric, hydroxy-functional compound, wherein the hydroxy-functional compound includes a saccharide or a derivative thereof.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended drawings in which.

Figure 1:
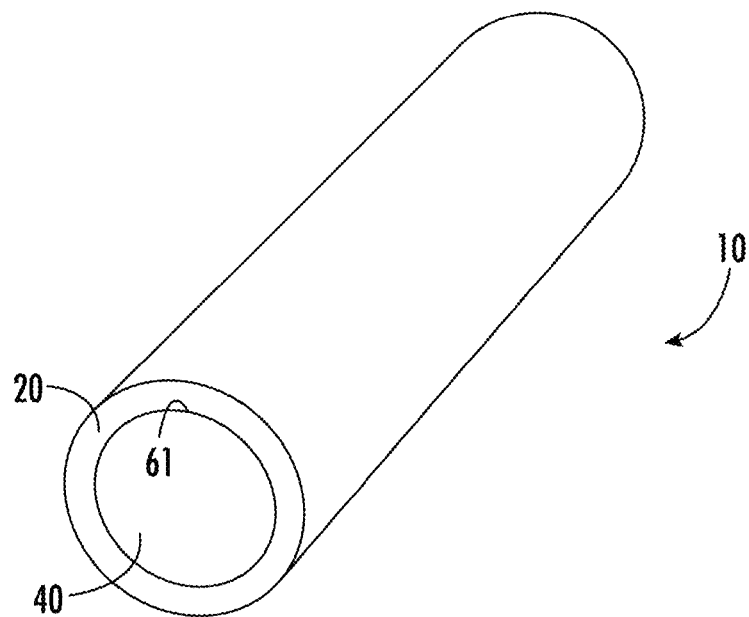
FIG. 1 is a perspective view of one embodiment of the implantable device of the present invention.

Repeat use of references characters in the present specification and drawing is intended to represent same or analogous features or elements of the invention.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to an implantable device that is capable of delivering a macromolecular drug compound for prohibiting and/or treating a condition, disease, and/or cosmetic state in a patient (e.g., human, pet, farm animal, racehorse, etc.). The implantable device may have a variety of different geometric shapes, such as cylindrical (rod), disc, ring, doughnut, helical, elliptical, triangular, ovular, etc. In one embodiment, for example, the device may have a generally circular cross-sectional shape so that the overall structure is in the form of a cylinder (rod) or disc. In such embodiments, the device will typically have a diameter of from about 0.5 to about 50 millimeters, in some embodiments from about 1 to about 40 millimeters, and in some embodiments, from about 5 to about 30 millimeters. The length of the device may vary, but is typically in the range of from about 1 to about 25 millimeters. Cylindrical devices may, for instance, have a length of from about 5 to about 50 millimeters, while disc-shaped devices may have a length of from about 0.5 to about 5 millimeters.

Regardless of the particular shape or size, the device is multilayered in that it contains at least one membrane layer positioned adjacent to an outer surface of a core. The core contains a core polymer matrix that includes a hydrophobic polymer and a macromolecular drug compound that is dispersed within the core polymer matrix. The membrane layer(s) includes a plurality of water-soluble particles distributed within a membrane polymer matrix that contains an ethylene vinyl acetate copolymer. The water-soluble particles have a controlled particle size, such as a median diameter (D50) of about 150 micrometers or less, in some embodiments about 100 micrometers or less, in some embodiments about 90 micrometers or less, in some embodiments about 0.1 to about 80 micrometers, and in some embodiments, from about 0.5 to about 70 micrometers, such as determined using a laser scattering particle size distribution analyzer (e.g., LA-960 from Horiba). The particles may also have a narrow size distribution such that 90% or more of the particles by volume (D90) have a diameter within the ranges noted above. The water-soluble particles also generally contain a hydroxy-functional compound that is not polymeric.

Through selective control over the particular nature of the water-soluble particles and ethylene vinyl acetate copolymer employed within the membrane layer(s) as noted above, the present inventors have discovered that the resulting device can be effective for sustained release over a macromolecular drug compound over a prolonged period of time. For example, the implantable device can release a macromolecular drug compound for a time period of about 5 days or more, in some embodiments about 10 days or more, in some embodiments from about 15 days to about 150 days, in some embodiments from about 20 days to about 60 days, and in some embodiments, from about 25 days to about 50 days (e.g., about 30 days). Further, the present inventors have also discovered that the drug compound can be released in a controlled manner (e.g., zero order or near zero order) over the course of the release time period. After a time period of 15 days, for example, the cumulative weight-based release ratio of the implantable device may be from about 20% to about 70%, in some embodiments from about 30% to about 65%, and in some embodiments, from about 40% to about 60%. Likewise, after a time period of 30 days, the cumulative weight-based release ratio of the implantable device may be from about 40% to about 85%, in some embodiments from about 50% to about 80%, and in some embodiments, from about 60% to about 80%. The "cumulative weight-based release ratio" may be determined by dividing the amount of the drug compound released at a particulate time interval by the total amount of drug compound initially present, and then multiplying this number by 100. Furthermore, after a time period of 30 days, the cumulative surface area-based release ratio of the implantable device may be from about 5 to about 70 mg/cm$^2$, in some embodiments from about 10 to about 50 mg/cm$^2$, and in some embodiments, from about 15 to about 40 mg/cm$^2$. Likewise, after a time period of 90 days, the cumulative surface area-based release ratio of the implantable device may be from about 15 to about 70 mg/cm$^2$, in some embodiments from about 20 to about 60 mg/cm$^2$, and in some embodiments, from about 30 to about 50 mg/cm$^2$. Furthermore, after a time period of 120 days, the cumulative surface area-based release ratio of the implantable device may be from about 30 to about 70 mg/cm$^2$, in some embodiments from about 35 to about 65 mg/cm$^2$, and in some embodiments, from about 40 to about 50 mg/cm$^2$. The "cumulative surface area-based release ratio" may be determined by dividing the amount of the drug compound released at a particulate time interval ("mg") by the surface area of the implantable device from which the drug compound can be released ("cm$^2$").

Of course, the actual dosage level of the drug compound delivered will vary depending on the particular drug compound employed and the time period for which it is intended to be released. The dosage level is generally high enough to provide a therapeutically effective amount of the drug compound to render a desired therapeutic outcome, i.e., a level or amount effective to reduce or alleviate symptoms of the condition for which it is administered. The exact amount necessary will vary, depending on the subject being treated, the age and general condition of the subject to which the macromolecular drug compound is to be delivered, the capacity of the subject's immune system, the degree of effect desired, the severity of the condition being treated, the particular macromolecular drug compound selected and mode of administration of the composition, among other factors. An appropriate effective amount can be readily determined by one of skill in the art. For example, an effective amount will typically range from about 5 μg to about 200 mg, in some embodiments from about 5 μg to about 100 mg per day, and in some embodiments, from about 10 μg to about 1 mg of the macromolecular drug compound delivered per day.

Various embodiments of the present invention will now be described in more detail.

I. Core

As indicated above, the core polymer matrix contains at least polymer that is generally hydrophobic in nature so that it can retain its structural integrity for a certain period of time when placed in an aqueous environment, such as the body of a mammal, and stable enough to be stored for an extended period before use. Examples of suitable hydrophobic polymers for this purpose may include, for instance, silicone polymer, polyolefins, polyvinyl chloride, polycarbonates, polysulphones, styrene acrylonitrile copolymers, polyurethanes, silicone polyether-urethanes, polycarbonate-urethanes, silicone polycarbonate-urethanes, etc., as well as combinations thereof. Of course, hydrophilic polymers that are coated or otherwise encapsulated with a hydrophobic polymer are also suitable for use in the core polymer matrix. Typically, the melt flow index of the hydrophobic polymer ranges from about 0.2 to about 100 g/10 min, in some embodiments from about 5 to about 90 g/10 min, in some embodiments from about 10 to about 80 g/10 min, and in some embodiments, from about 30 to about 70 g/10 min, as determined in accordance with ASTM D1238-13 at a temperature of 190° C. and a load of 2.16 kilograms.

In certain embodiments, the core polymer matrix may contain a semi-crystalline olefin copolymer. The melting temperature of such an olefin copolymer may, for instance, range from about 40° C. to about 140° C., in some embodiments from about 50° C. to about 125° C., and in some embodiments, from about 60° C. to about 120° C., as determined in accordance with ASTM D3418-15. Such copolymers are generally derived from at least one olefin monomer (e.g., ethylene, propylene, etc.) and at least one polar monomer that is grafted onto the polymer backbone and/or incorporated as a constituent of the polymer (e.g., block or random copolymers). Suitable polar monomers include, for instance, a vinyl acetate, vinyl alcohol, maleic anhydride, maleic acid, (meth)acrylic acid (e.g., acrylic acid, methacrylic acid, etc.), (meth)acrylate (e.g., acrylate, methacrylate, ethyl acrylate, methyl methacrylate, ethyl methacrylate, etc.), and so forth. A wide variety of such copolymers may generally be employed in the polymer composition, such as ethylene vinyl acetate copolymers, ethylene (meth)acrylic acid polymers (e.g., ethylene acrylic acid copolymers and partially neutralized ionomers of these copolymers, ethylene methacrylic acid copolymers and partially neutralized ionomers of these copolymers, etc.), ethylene (meth)acrylate polymers (e.g., ethylene methylacrylate copolymers, ethylene ethyl acrylate copolymers, ethylene butyl acrylate copolymers, etc.), and so forth. Regardless of the particular monomers selected, certain aspects of the copolymer can be selectively controlled to help achieve the desired release properties. For instance, the polar monomeric content of the copolymer may be selectively controlled to be within a range of from about 10 wt. % to about 60 wt. %, in some embodiments about 20 wt. % to about 60 wt. %, and in some embodiments, from about 25 wt. % to about 50 wt. %. Conversely, the olefin monomeric content of the copolymer may likewise be within a range of from about 40 wt. % to about 90 wt. %, in some embodiments about 40 wt. % to about 80 wt. %, and in some embodiments, from about 50 wt. % to about 75 wt. %.

In one particular embodiment, for example, the core polymer matrix may contain at least one ethylene vinyl acetate polymer, which is a copolymer that is derived from at least one ethylene monomer and at least one vinyl acetate monomer. In certain cases, the present inventors have discovered that certain aspects of the copolymer can be selectively controlled to help achieve the desired release properties. For instance, the vinyl acetate content of the copolymer may be selectively controlled to be within a range of from about 10 wt. % to about 60 wt. %, in some embodiments from about 20 wt. % to about 60 wt. %, in some embodiments from about 25 wt. % to about 50 wt. %, in some embodiments from about 30 wt. % to about 48 wt. %, and in some embodiments, from about 35 wt. % to about 45 wt. % of the copolymer. Conversely, the ethylene content of the copolymer may likewise be within a range of from about 40 wt. % to about 90 wt. %, in some embodiments from about 40 wt. % to about 80 wt. %, in some embodiments from about 50 wt. % to about 75 wt. %, in some embodiments from about 50 wt. % to about 80 wt. %, in some embodiments from about 52 wt. % to about 70 wt. %, and in some embodiments, from about 55 wt. % to about 65 wt. %. The melt flow index of the ethylene vinyl acetate copolymer(s) and resulting polymer matrix may also range from about 0.2 to about 100 g/10 min, in some embodiments from about 5 to about 90 g/10 min, in some embodiments from about 10 to about 80 g/10 min, and in some embodiments, from about 30 to about 70 g/10 min, as determined in accordance with ASTM D1238-20 at a temperature of 190° C. and a load of 2.16 kilograms. The density of the ethylene vinyl acetate copolymer(s) may also range from about 0.900 to about 1.00 gram per cubic centimeter (g/cm$^3$), in some embodiments from about 0.910 to about 0.980 g/cm$^3$, and in some embodiments, from about 0.940 to about 0.970 g/cm$^3$, as determined in accordance with ASTM D1505-18. Particularly suitable examples of ethylene vinyl acetate copolymers that may be employed include those available from Celanese under the designation ATEVA® (e.g., ATEVA® 4030AC); Dow under the designation ELVAX® (e.g., ELVAX® 40W); and Arkema under the designation EVATANE® (e.g., EVATANE 40-55).

Any of a variety of techniques may generally be used to form the ethylene vinyl acetate copolymer(s) with the desired properties as is known in the art. In one embodiment, the polymer is produced by copolymerizing an ethylene monomer and a vinyl acetate monomer in a high pressure reaction. Vinyl acetate may be produced from the oxidation of butane to yield acetic anhydride and acetaldehyde, which can react together to form ethylidene diacetate. Ethylidene diacetate can then be thermally decomposed in the presence of an acid catalyst to form the vinyl acetate monomer. Examples of suitable acid catalysts include aromatic sulfonic acids (e.g., benzene sulfonic acid, toluene sulfonic acid, ethylbenzene sulfonic acid, xylene sulfonic acid, and naphthalene sulfonic acid), sulfuric acid, and alkanesulfonic acids, such as described in U.S. Pat. No. 2,425,389 to Oxley et al.; U.S. Pat. No. 2,859,241 to Schnizer; and U.S. Pat. No. 4,843,170 to Isshiki et al. The vinyl acetate monomer can also be produced by reacting acetic anhydride with hydrogen in the presence of a catalyst instead of acetaldehyde. This process converts vinyl acetate directly from acetic anhydride and hydrogen without the need to produce ethylidene diacetate. In yet another embodiment, the vinyl acetate monomer can be produced from the reaction of acetaldehyde and a ketene in the presence of a suitable solid catalyst, such as a perfluorosulfonic acid resin or zeolite.

In certain embodiments, it may also be desirable to employ blends of an ethylene vinyl acetate copolymer and another hydrophobic polymer such that the overall blend and polymer matrix have a melting temperature and/or melt flow index within the range noted above. For example, the polymer matrix may contain a first ethylene vinyl acetate copolymer and a second ethylene vinyl acetate copolymer having a melting temperature that is greater than the melting temperature of the first copolymer. The second copolymer may likewise have a melt flow index that is the same, lower, or higher than the corresponding melt flow index of the first copolymer. The first copolymer may, for instance, have a melting temperature of from about 20° C. to about 60° C., in some embodiments from about 25° C. to about 55° C., and in some embodiments, from about 30° C. to about 50° C., such as determined in accordance with ASTM D3418-15, and/or a melt flow index of from about 40 to about 900 g/10 min, in some embodiments from about 50 to about 500 g/10 min, and in some embodiments, from about 55 to about 250 g/10 min, as determined in accordance with ASTM D1238-20 at a temperature of 190° C. and a load of 2.16 kilograms. The second copolymer may likewise have a melting temperature of from about 50° C. to about 100° C., in some embodiments from about 55° C. to about 90° C., and in some embodiments, from about 60° C. to about 80° C., such as determined in accordance with ASTM D3418-15, and/or a melt flow index of from about 0.2 to about 55 g/10 min, in some embodiments from about 0.5 to about 50 g/10 min, and in some embodiments, from about 1 to about 40 g/10 min, as determined in accordance with ASTM D1238-20 at a temperature of 190° C. and a load of 2.16 kilograms. The first copolymer may constitute from about 20 wt. % to about 80 wt. %, in some embodiments from about 30 wt. % to about 70 wt. %, and in some embodiments, from about 40 wt. % to about 60 wt. % of the polymer matrix, and the second copolymer may likewise constitute from about 20 wt. % to about 80 wt. %, in some embodiments from about 30 wt. % to about 70 wt. %, and in some embodiments, from about 40 wt. % to about 60 wt. % of the polymer matrix.

In certain cases, ethylene vinyl acetate copolymer(s) constitute the entire polymer content of the core polymer matrix. In other cases, however, it may be desired to include other polymers, such as other hydrophobic polymers. When employed, it is generally desired that such other polymers constitute from about 0.001 wt. % to about 30 wt. %, in some embodiments from about 0.01 wt. % to about 20 wt. %, and in some embodiments, from about 0.1 wt. % to about 10 wt. % of the polymer content of the polymer matrix. In such cases, ethylene vinyl acetate copolymer(s) may constitute about from about 70 wt. % to about 99.999 wt. %, in some embodiments from about 80 wt. % to about 99.99 wt. %, and in some embodiments, from about 90 wt. % to about 99.9 wt. % of the polymer content of the polymer matrix.

One or more drug compounds are also dispersed within the core polymer matrix that are capable of prohibiting and/or treating a condition, disease, and/or cosmetic state a patient. The drug compound may be prophylactically, therapeutically, and/or cosmetically active, systemically or locally. Regardless, at least one drug compound within the core is a "macromolecular" compound in the sense that it has a large molecular weight, such as about 0.5 kilodaltons ("kDa") or more, in some embodiments about 1 kDa or more, in some embodiments from about 5 kDa to about 250 kDa, and in some embodiments, from about 20 kDa to about 200 kDa. Typically, the bioactivity of such compounds depends upon a unique three-dimensional (e.g., folded) structure of the molecule. This three-dimensional molecular structure is substantially maintained by specific non-covalent bonding interactions, such as hydrogen bonding and hydrophobic bonding interactions between atoms (hydrophobicity). The drug compound can be either naturally occurring or man-made by any method known in the art. Typically, it is also desired that the drug compound is stable at high temperatures so that it can be incorporated into the polymer matrix at or near the melting temperature of the hydrophobic polymer employed in the core polymer matrix without significantly degrading (e.g., melting) during manufacturing or use of the device. For example, the drug compound typically remains stable at temperatures of from about 25° C. to about 120° C., in some embodiments from about 40° C. to about 110° C., in some embodiments from about 40° C. to about 100° C., in some embodiments from about 40° C. to about 80° C., and in some embodiments, from about 50° C. to about 70° C. The drug compound may be inherently stable at such temperatures, or it may also ben encapsulated or otherwise protected by a carrier molecule that is stable at such temperatures, such as a phospholipid, sugar, peptide, protein, synthetic polymer, etc.

Particular examples of suitable macromolecular drug compounds may include, for instance, proteins, peptides, enzymes, antibodies, interferons, interleukins, blood factors, vaccines, nucleotides, lipids, etc., as well as analogues, derivatives, and combinations thereof. Suitable proteins or peptides may include, for instance, adrenocorticotropic hormone, angiotensin, beta-endorphin, bombesin, calcitonin, calcitonin gene relating polypeptide, cholecystokinin-8, colony stimulating factors, desmopressin, endothelin, enkephalin, erythropoietins, gastrins, glucagon, human atrial natriuretic polypeptide, interferons, insulin, growth factors, growth hormones, luteinizing hormone release hormone, melanocyte stimulating hormone, muramyl-dipeptide, neurotensin, oxytocin, parathyroid hormone, peptide T, secretin, somatomedins, somatostatin, thyroid stimulating hormone, thyrotropin releasing hormone, thyrotropin stimulating hormone, vasoactive intestinal polypeptide, vasopressin, etc. Suitable antibodies (e.g., monoclonal antibodies) may include, without limitation, HIV monoclonal antibody 2F5, rituxumab, infliximab, trastuzumab, adalimumab, omalizumab, tositumomab, efalizumab, and cetuximab. Suitable interferons may include interferon alpha-2b, peg interferon alpha-2b, interferon alpha-2b+ribavirin, interferon alpha-2a, pegylated interferon alpha-2a, interferon beta-1a, and interferon beta. Suitable blood factors may include alteplase/tenecteplase and rhesus factor Vila. Suitable interleukins may include interleukin-2. Suitable vaccines may include whole viral particles, recombinant proteins, subunit proteins such as gp41, gp120 and gp140, DNA vaccines, plasmids, bacterial vaccines, polysaccharides such as extracellular capsular polysaccharides, and other vaccine vectors. Likewise, suitable nucleic acids may include RNA- or DNA-based molecules, such as oligonucleotides, aptamers, ribozymes, DNAzymes and small interfering RNAs, such as messenger (mRNA), transfer (tRNA), ribosomal (rRNA), interfering (iRNA), small interfering (siRNA), etc.

In certain embodiments, the implantable device of the present invention may be particularly suited to deliver an antibody ("Ab") as a macromolecule drug compound. The term "antibody" includes, by way of example, both naturally occurring and non-naturally occurring Abs, monoclonal and polyclonal Abs, chimeric and humanized Abs, human or nonhuman Abs, wholly synthetic Abs, single chain Abs, etc. A nonhuman Ab may be humanized by recombinant methods to reduce its immunogenicity in man. The term "antibody" also includes an antigen-binding fragment or an antigen-binding portion of any of the aforementioned immunoglobulins, and includes a monovalent and a divalent fragment or portion, and a single chain Ab. Particularly suitable antibodies may include monoclonal antibodies ("MAbs"). The term "monoclonal antibody" generally refers to a non-naturally occurring preparation of Ab molecules of single molecular composition, i.e., Ab molecules whose primary sequences are essentially identical, and which exhibits a single binding specificity and affinity for a particular epitope. MAbs may be produced by hybridoma, recombinant, transgenic or other techniques known to those skilled in the art. A "human" monoclonal antibody (HuMAb) refers to an Ab having variable regions in which both the framework and CDR regions are derived from human germline immunoglobulin sequences. Furthermore, if the Ab contains a constant region, the constant region also is derived from human germline immunoglobulin sequences. The human Abs may include amino acid residues not encoded by human germline immunoglobulin sequences (e.g., mutations introduced by random or site-specific mutagenesis in vitro or by somatic mutation in vivo). However, the term "human antibody", as used herein, is not intended to include Abs in which CDR sequences derived from the germline of another mammalian species, such as a mouse, have been grafted onto human framework sequences.

In one particular embodiment, for example, the macromolecular drug compound may be an anti-PD-1 and/or anti-PD-L1 antibody, such as employed as immune checkpoint inhibitors for treating cancer. PD-1 (or Programmed Death-1) refers to an immunoinhibitory receptor belonging to the CD28 family. PD-1 is expressed predominantly on previously activated T cells in vivo, and binds to two ligands, PD-L1 and PD-L2. The term "PD-1" as used herein includes human PD-1 (hPD-1), variants, isoforms, and species homologs of hPD-1, and analogs having at least one common epitope with hPD-1. The complete hPD-1 sequence can be found under GenBank Accession No. U64863. PD-L1 (or Programmed Death Ligand-1) is one of two cell surface glycoprotein ligands for PD-1 (the other being PD-L2) that downregulate T cell activation and cytokine secretion upon binding to PD-1. The term "PD-L1" as used herein includes human PD-L1 (hPD-LI), variants, isoforms, and species homologs of hPD-LI, and analogs having at least one common epitope with hPD-LI. The complete hPD-LI sequence can be found under GenBank Accession No. Q9NZQ7. HuMAbs that bind specifically to PD-1 with high affinity have been described, for instance, in U.S. Pat. Nos. 8,008,449 and 8,779,105. Other anti-PD-1 mAbs have been described in, for example, U.S. Pat. Nos. 6,808,710, 7,488,802, 8,168,757 and 8,354,509, and PCT Publication No. WO 2012/145493. For example, the anti-PD-1 MAb may be nivolumab. Nivolumab (also known as Opdivo®; formerly designated 5C4, BMS-936558, MDX-1106, or ONO-4538) is a fully human IgG4 (S228P) PD-1 immune checkpoint inhibitor Ab that selectively prevents interaction with PD-1 ligands (PD-LI and PD-L2), thereby blocking the down-regulation of antitumor T-cell functions (U.S. Pat. No. 8,008,449). In another embodiment, the anti-PD-1 mAb is pembrolizumab. Pembrolizumab (also known as Keytruda®, lambrolizumab, and MK-3475) is a humanized monoclonal IgG4 antibody directed against human cell surface receptor PD-1 (programmed death-1 or programmed cell death-1). Pembrolizumab is described, for example, in U.S. Pat. Nos. 8,354,509 and 8,900,587). In other embodiments, the anti-PD-1 MAb is MEDI0608 (formerly AMP-514) as described, for example, in U.S. Pat. No. 8,609,089. Yet other examples of humanized monoclonal antibodies include Pidilizumab (CT-011), BGB-A317, etc.

Typically, macromolecular drug compounds will constitute from about 5 wt. % to about 60 wt. %, in some embodiments from about 10 wt. % to about 50 wt. %, and in some embodiments, from about 15 wt. % to about 45 wt. % of the core, while the core polymer matrix constitutes from about 40 wt. % to about 95 wt. %, in some embodiments from about 50 wt. % to about 90 wt. %, and in some embodiments, from about 55 wt. % to about 85 wt. % of the core. The core may also optionally contain one or more excipients if so desired, such as radiocontrast agents, release modifiers, bulking agents, plasticizers, surfactants, cross-linking agents, flow aids, colorizing agents (e.g., chlorophyll, methylene blue, etc.), antioxidants, stabilizers, lubricants, other types of antimicrobial agents, preservatives, etc. to enhance properties and processability. When employed, the optional excipient(s) typically constitute from about 0.01 wt. % to about 20 wt. %, and in some embodiments, from about 0.05 wt. % to about 15 wt. %, and in some embodiments, from about 0.1 wt. % to about 10 wt. % of the core. In one embodiment, for instance, a radiocontrast agent may be employed to help ensure that the device can be detected in an X-ray based imaging technique (e.g., computed tomography, projectional radiography, fluoroscopy, etc.). Examples of such agents include, for instance, barium-based compounds, iodine-based compounds, zirconium-based compounds (e.g., zirconium dioxide), etc. One particular example of such an agent is barium sulfate. Other known antimicrobial agents and/or preservatives may also be employed to help prevent surface growth and attachment of bacteria, such as metal compounds (e.g., silver, copper, or zinc), metal salts, quaternary ammonium compounds, etc.

Regardless of the particular components employed, the core may be formed through a variety of known techniques, such as by hot-melt extrusion, injection molding, solvent casting, dip coating, spray coating, microextrusion, coacervation, compression molding (e.g., vacuum compression molding), etc. In one embodiment, a hot-melt extrusion technique may be employed. Hot-melt extrusion is generally a solvent-free process in which the components of the core (e.g., hydrophobic polymer, drug compound(s), optional excipients, etc.) may be melt blended and optionally shaped in a continuous manufacturing process to enable consistent output quality at high throughput rates. This technique is particularly well suited to various types of hydrophobic polymers, such as olefin copolymers. Namely, such copolymers typically exhibit a relatively high degree of long-chain branching with a broad molecular weight distribution. This combination of traits can lead to shear thinning of the copolymer during the extrusion process, which help facilitates hot-melt extrusion. Furthermore, the polar comonomer units (e.g., vinyl acetate) can serve as an "internal" plasticizer by inhibiting crystallization of the polyethylene chain segments. This may lead to a lower melting point of the olefin copolymer, which improves the overall flexibility of the resulting material and enhances its ability to be formed into devices of a wide variety of shapes and sizes.

During a hot-melt extrusion process, melt blending may occur at a temperature range of from about 20° C. to about 200° C., in some embodiments, from about 30° C. to about 150° C., in some embodiments from about 40° C. to about 100° C., and in some embodiments from about 45° C. to about 80° C., and in some embodiments, from about 50° C. to about 70° C. to form a polymer composition. Any of a variety of melt blending techniques may generally be employed. For example, the components may be supplied separately or in combination to an extruder that includes at least one screw rotatably mounted and received within a barrel (e.g., cylindrical barrel). The extruder may be a single screw or twin screw extruder. For example, one embodiment of a single screw extruder may contain a housing or barrel and a screw rotatably driven on one end by a suitable drive (typically including a motor and gearbox). If desired, a twin-screw extruder may be employed that contains two separate screws. The configuration of the screw is not particularly critical and it may contain any number and/or orientation of threads and channels as is known in the art. For example, the screw typically contains a thread that forms a generally helical channel radially extending around a core of the screw. A feed section and melt section may be defined along the length of the screw. The feed section is the input portion of the barrel where the olefin copolymer(s) and/or drug compound(s) are added. The melt section is the phase change section in which the copolymer is changed from a solid to a liquid-like state. While there is no precisely defined delineation of these sections when the extruder is manufactured, it is well within the ordinary skill of those in this art to reliably identify the feed section and the melt section in which phase change from solid to liquid is occurring. Although not necessarily required, the extruder may also have a mixing section that is located adjacent to the output end of the barrel and downstream from the melting section. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

If desired, the ratio of the length ("L") to diameter ("D") of the screw may be selected to achieve an optimum balance between throughput and blending of the components. The L/D value may, for instance, range from about 10 to about 50, in some embodiments from about 15 to about 45, and in some embodiments from about 20 to about 40. The length of the screw may, for instance, range from about 0.1 to about 5 meters, in some embodiments from about 0.4 to about 4 meters, and in some embodiments, from about 0.5 to about 2 meters. The diameter of the screw may likewise be from about 5 to about 150 millimeters, in some embodiments from about 10 to about 120 millimeters, and in some embodiments, from about 20 to about 80 millimeters. In addition to the length and diameter, other aspects of the extruder may also be selected to help achieve the desired degree of blending. For example, the speed of the screw may be selected to achieve the desired residence time, shear rate, melt processing temperature, etc. For example, the screw speed may range from about 10 to about 800 revolutions per minute ("rpm"), in some embodiments from about 20 to about 500 rpm, and in some embodiments, from about 30 to about 400 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Once melt blended together, the resulting polymer composition may be in the form of pellets, sheets, fibers, filaments, etc., which may be shaped into the core using a variety of known shaping techniques, such as injection molding, compression molding, nanomolding, overmolding, blow molding, three-dimensional printing, etc. Injection molding may, for example, occur in two main phases—i.e., an injection phase and holding phase. During the injection phase, a mold cavity is filled with the molten polymer composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold. Any suitable injection molding equipment may generally be employed in the present invention. In one embodiment, an injection molding apparatus may be employed that includes a first mold base and a second mold base, which together define a mold cavity having the shape of the core. The molding apparatus includes a resin flow path that extends from an outer exterior surface of the first mold half through a sprue to a mold cavity. The polymer composition may be supplied to the resin flow path using a variety of techniques. For example, the composition may be supplied (e.g., in the form of pellets) to a feed hopper attached to an extruder barrel that contains a rotating screw (not shown). As the screw rotates, the pellets are moved forward and undergo pressure and friction, which generates heat to melt the pellets. A cooling mechanism may also be provided to solidify the resin into the desired shape of the core (e.g., disc, rod, etc.) within the mold cavity. For instance, the mold bases may include one or more cooling lines through which a cooling medium flows to impart the desired mold temperature to the surface of the mold bases for solidifying the molten material. The mold temperature (e.g., temperature of a surface of the mold) may range from about 50° C. to about 120° C., in some embodiments from about 60° C. to about 110° C., and in some embodiments, from about 70° C. to about 90° C.

As indicated above, another suitable technique for forming a core of the desired shape and size is three-dimensional printing. During this process, the polymer composition may be incorporated into a printer cartridge that is readily adapted for use with a printer system. The printer cartridge may, for example, contains a spool or other similar device that carries the polymer composition. When supplied in the form of filaments, for example, the spool may have a generally cylindrical rim about which the filaments are wound. The spool may likewise define a bore or spindle that allows it to be readily mounted to the printer during use. Any of a variety of three-dimensional printer systems can be employed in the present invention. Particularly suitable printer systems are extrusion-based systems, which are often referred to as "fused deposition modeling" systems. For example, the polymer composition may be supplied to a build chamber of a print head that contains a platen and gantry. The platen may move along a vertical z-axis based on signals provided from a computer-operated controller. The gantry is a guide rail system that may be configured to move the print head in a horizontal x-y plane within the build chamber based on signals provided from controller. The print head is supported by the gantry and is configured for printing the build structure on the platen in a layer-by-layer manner, based on signals provided from the controller. For example, the print head may be a dual-tip extrusion head.

Compression molding (e.g., vacuum compression molding) may also be employed. In such a method, a layer of the device may be formed by heating and compressing the polymer compression into the desired shape while under vacuum. More particularly, the process may include forming the polymer composition into a precursor that fits within a chamber of a compression mold, heating the precursor, and compression molding the precursor into the desired layer while the precursor is heated. The polymer composition may be formed into a precursor through various techniques, such as by dry power mixing, extrusion, etc. The temperature during compression may range from about 50° C. to about 120° C., in some embodiments from about 60° C. to about 110° C., and in some embodiments, from about 70° C. to about 90° C. A vacuum source may also apply a negative pressure to the precursor during molding to help ensure that it retains a precise shape. Examples of such compression molding techniques are described, for instance, in U.S. Pat. No. 10,625,444 to Treffer, et al., which is incorporated herein in its entirety by reference thereto.

II. Membrane Layer

Figure 2:
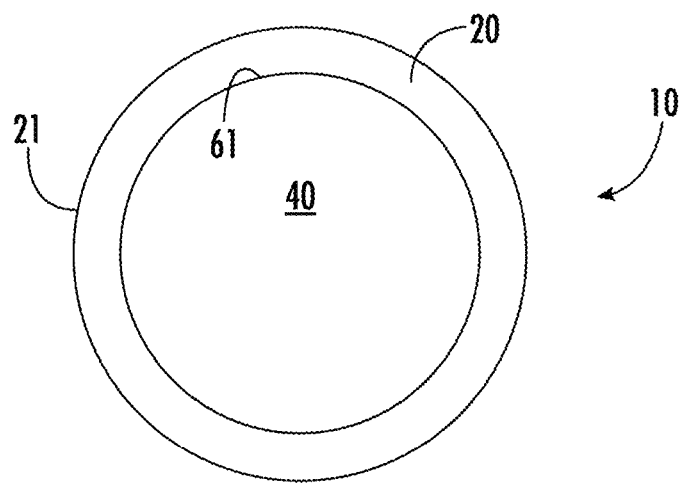
FIG. 2 is a cross-sectional view of the implantable device of FIG. 1.

As indicated above, the implantable device contains at least one membrane layer that is positioned adjacent to an outer surface of a core. The number of membrane layers may vary depending on the particular configuration of the device, the nature of the drug compound, and the desired release profile. For example, the device may contain only one membrane layer. Referring to FIGS. 1-2, for example, one embodiment of an implantable device 10 is shown that contains a core 40 having a generally circular cross-sectional shape and is elongated so that the resulting device is generally cylindrical in nature. The core 40 defines an outer circumferential surface 61 about which a membrane layer 20 is circumferentially disposed. Similar to the core 40, the membrane layer 20 also has a generally circular cross-sectional shape and is elongated so that it covers the entire length of the core 40. During use of the device 10, a drug compound is capable of being released from the core 40 and through the membrane layer 20 so that it exits from an external surface 21 of the device.

Figure 3:
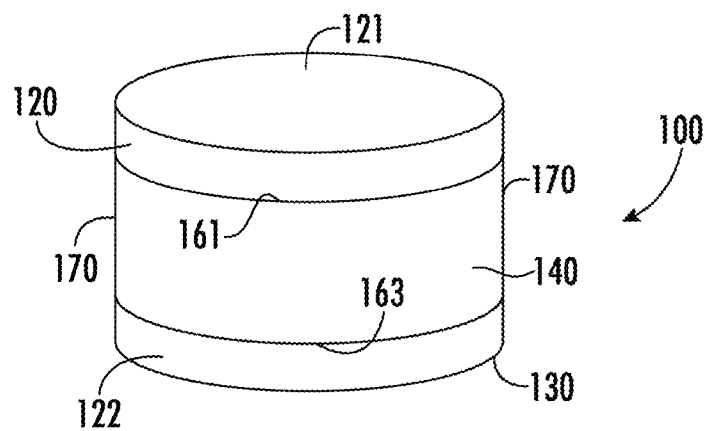
FIG. 3 is a perspective view of another embodiment of the implantable device of the present invention.
Figure 4:
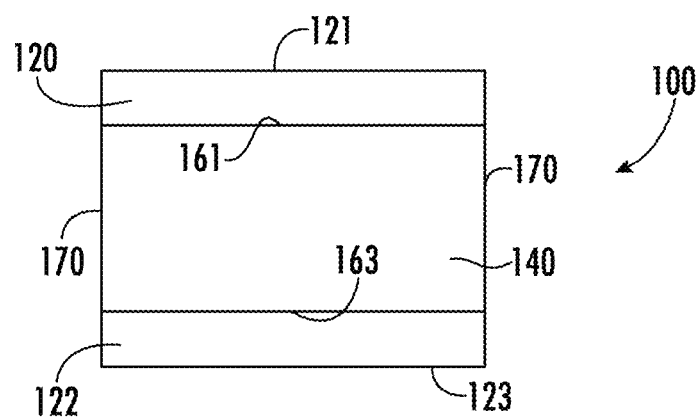
FIG. 4 is a cross-sectional view of the implantable device of FIG. 3.

Of course, in other embodiments, the device may contain multiple membrane layers. In the device of FIGS. 1-2, for example, one or more additional membrane layers (not shown) may be disposed over the membrane layer 20 to help further control release of the drug compound. In other embodiments, the device may be configured so that the core is positioned or sandwiched between separate membrane layers. Referring to FIGS. 3-4, for example, one embodiment of an implantable device 100 is shown that contains a core 140 having a generally circular cross-sectional shape and is elongated so that the resulting device is generally disc-shaped in nature. The core 140 defines an upper outer surface 161 on which is positioned a first membrane layer 120 and a lower outer surface 163 on which is positioned a second membrane layer 122. Similar to the core 140, the first membrane layer 120 and the second membrane layer 122 also have a generally circular cross-sectional shape that generally covers the core 140. If desired, edges of the membrane layers 120 and 122 may also extend beyond the periphery of the core 140 so that they can be sealed together to cover any exposed areas of an external circumferential surface 170 of the core 140. During use of the device 100, a drug compound is capable of being released from the core 140 and through the first membrane layer 120 and second membrane layer 122 so that it exits from external surfaces 121 and 123 of the device. Of course, if desired, one or more additional membrane layers (not shown) may also be disposed over the first membrane layer 120 and/or second membrane layer 122 to help further control release of the drug compound.

Regardless of the particular configuration employed, the membrane layer(s) generally contain a plurality of water-soluble particles distributed within a membrane polymer matrix. As indicated above, the particle size of the water-soluble particles is controlled to help achieve the desired delivery rate. More particularly, the median diameter (D50) of the particles is about 100 micrometers or less, in some embodiments about 80 micrometers or less, in some embodiments about 60 micrometers or less, and in some embodiments, from about 1 to about 40 micrometers, such as determined using a laser scattering particle size distribution analyzer (e.g., LA-960 from Horiba). The particles may also have a narrow size distribution such that 90% or more of the particles by volume (D90) have a diameter within the ranges noted above. In addition to controlling the particle size, the materials employed to form the water-soluble particles are also selected to achieve the desired release profile. More particularly, the water-soluble particles generally contain a hydroxy-functional compound that is not polymeric. The term "hydroxy-functional" generally means that the compound contains at least one hydroxyl group, and in certain cases, multiple hydroxyl groups, such as 2 or more, in some embodiments 3 or more, in some embodiments 4 to 20, and in some embodiments, from 5 to 16 hydroxyl groups. The term "non-polymeric" likewise generally means that the compound does not contain a significant number of repeating units, such as no more than 10 repeating units, in some embodiments no or more than 5 repeating units, in some embodiments no more than 3 repeating units, and in some embodiments, no more than 2 repeating units. In some cases, such a compound lacks any repeating units. Such non-polymeric compounds thus a relatively low molecular weight, such as from about 1 to about 650 grams per mole, in some embodiments from about 5 to about 600 grams per mole, in some embodiments from about 10 to about 550 grams per mole, in some embodiments from about 50 to about 500 grams per mole, in some embodiments from about 80 to about 450 grams per mole, and in some embodiments, from about 100 to about 400 grams per mole. Particularly suitable non-polymeric, hydroxy-functional compounds that may be employed in the present invention include, for instance, saccharides and derivatives thereof, such as monosaccharides (e.g., dextrose, fructose, galactose, ribose, deoxyribose, etc.); disaccharides (e.g., sucrose, lactose, maltose, etc.); sugar alcohols (e.g., xylitol, sorbitol, mannitol, maltitol, erythritol, galactitol, isomalt, inositol, lactitol, etc.); and so forth, as well as combinations thereof.

As indicated above, the membrane polymer matrix likewise contains at least one ethylene vinyl acetate copolymer, such as described in more detail above. The vinyl acetate content of the copolymer may be selectively controlled to be within a range of from about 10 wt. % to about 60 wt. %, in some embodiments from about 20 wt. % to about 60 wt. %, in some embodiments from about 25 wt. % to about 50 wt. %, in some embodiments from about 30 wt. % to about 48 wt. %, and in some embodiments, from about 35 wt. % to about 45 wt. % of the copolymer. Conversely, the ethylene content of the copolymer may likewise be within a range of from about 40 wt. % to about 90 wt. %, in some embodiments from about 40 wt. % to about 80 wt. %, in some embodiments from about 50 wt. % to about 75 wt. %, in some embodiments from about 50 wt. % to about 80 wt. %, in some embodiments from about 52 wt. % to about 70 wt. %, and in some embodiments, from about 55 wt. % to about 65 wt. %. The melt flow index of the ethylene vinyl acetate copolymer(s) and resulting polymer matrix may also range from about 0.2 to about 100 g/10 min, in some embodiments from about 5 to about 90 g/10 min, in some embodiments from about 10 to about 80 g/10 min, and in some embodiments, from about 30 to about 70 g/10 min, as determined in accordance with ASTM D1238-20 at a temperature of 190° C. and a load of 2.16 kilograms. The melting temperature of the ethylene vinyl acetate copolymer may also range from about 40° C. to about 140° C., in some embodiments from about 50° C. to about 125° C., and in some embodiments, from about 60° C. to about 120° C., as determined in accordance with ASTM D3418-15. The density of the ethylene vinyl acetate copolymer(s) may also range from about 0.900 to about 1.00 gram per cubic centimeter (g/cm$^3$), in some embodiments from about 0.910 to about 0.980 g/cm$^3$, and in some embodiments, from about 0.940 to about 0.970 g/cm$^3$, as determined in accordance with ASTM D1505-18. Particularly suitable examples of ethylene vinyl acetate copolymers that may be employed include those available from Celanese under the designation ATEVA® (e.g., ATEVA® 4030AC); Dow under the designation ELVAX® (e.g., ELVAX® 40W); and Arkema under the designation EVATANE® (e.g., EVATANE 40-55).

In certain cases, ethylene vinyl acetate copolymer(s) constitute the entire polymer content of the membrane polymer matrix. In other cases, however, it may be desired to include other polymers, such as other hydrophobic polymers. When employed, it is generally desired that such other polymers constitute from about 0.001 wt. % to about 30 wt. %, in some embodiments from about 0.01 wt. % to about 20 wt. %, and in some embodiments, from about 0.1 wt. % to about 10 wt. % of the polymer content of the polymer matrix. In such cases, ethylene vinyl acetate copolymer(s) may constitute about from about 70 wt. % to about 99.999 wt. %, in some embodiments from about 80 wt. % to about 99.99 wt. %, and in some embodiments, from about 90 wt. % to about 99.9 wt. % of the polymer content of the polymer matrix.

The membrane polymer matrix typically constitutes from about 50 wt. % to 99 wt. %, in some embodiments, from about 55 wt. % to about 98 wt. %, in some embodiments from about 60 wt. % to about 96 wt. %, and in some embodiments, from about 70 wt. % to about 95 wt. % of a membrane layer. Likewise, the water-soluble particles typically constitute from about 1 wt. % to about 50 wt. %, in some embodiments from about 2 wt. % to about 45 wt. %, in some embodiments from about 4 wt. % to about 40 wt. %, and in some embodiments, from about 5 wt. % to about 30 wt. % of a membrane layer.

When employing multiple membrane layers, it is typically desired that each membrane layer contains a polymer matrix that includes a plurality of water-soluble particles distributed within a membrane polymer matrix that includes an ethylene vinyl acetate copolymer. For example, a first membrane layer may contain first water-soluble particles distributed within a first membrane polymer matrix and a second membrane layer may contain second water-soluble particles distributed within a second membrane polymer matrix. In such embodiments, the first and second polymer matrices may each contain an ethylene vinyl acetate copolymer. The water-soluble particles and ethylene vinyl acetate copolymer(s) within one membrane layer may be the same or different than those employed in another membrane layer. In one embodiment, for instance, both the first and second membrane polymer matrices employ the same ethylene vinyl acetate copolymer(s) and the water-soluble particles within each layer have the same particle size and/or are formed from the same material. Likewise, the ethylene vinyl acetate copolymer(s) used in the membrane layer(s) may also be the same or different than the hydrophobic polymer(s) employed in the core. In one embodiment, for instance, both the core and the membrane layer(s) employ the same ethylene vinyl acetate copolymer. In yet other embodiments, the membrane layer(s) may employ an ethylene vinyl acetate copolymer that has a lower melt flow index than a hydrophobic polymer employed in the core. Among other things, this can further help control the release of the drug compound from the device. For example, the ratio of the melt flow index of a hydrophobic polymer employed in the core to the melt flow index of an ethylene vinyl acetate copolymer employed in the membrane layer(s) may be from about 1 to about 20, in some embodiments about 2 to about 15, and in some embodiments, from about 4 to about 12.

If desired, membrane layer(s) used in the device may optionally contain a macromolecular drug compound, such as described above, which is also dispersed within the polymer matrix. The drug compound in the membrane layer(s) may be the same or different than the drug compound employed in the core. When such a macromolecular drug compound is employed in a membrane layer, the membrane layer generally contains the drug compound in an amount such that the ratio of the concentration (wt. %) of the drug compound in the core to the concentration (wt. %) of the drug compound in the membrane layer is greater than 1, in some embodiments about 1.5 or more, and in some embodiments, from about 1.8 to about 4. When employed, drug compounds typically constitute only from about 1 wt. % to about 40 wt. %, in some embodiments from about 5 wt. % to about 35 wt. %, and in some embodiments, from about 10 wt. % to about 30 wt. % of a membrane layer. Of course, in other embodiments, the membrane layer is generally free of such macromolecular drug compounds prior to release from the core. When multiple membrane layers are employed, each membrane layer may generally contain the drug compound in an amount such that the ratio of the weight percentage of the drug compound in the core to the weight percentage of the drug compound in the membrane layer is greater than 1, in some embodiments about 1.5 or more, and in some embodiments, from about 1.8 to about 4.

The membrane layer(s) and/or the core may also optionally contain one or more excipients as described above, such as radiocontrast agents, bulking agents, plasticizers, surfactants, crosslinking agents, flow aids, colorizing agents (e.g., chlorophyll, methylene blue, etc.), antioxidants, stabilizers, lubricants, other types of antimicrobial agents, preservatives, etc. to enhance properties and processability. When employed, the optional excipient(s) typically constitute from about 0.01 wt. % to about 60 wt. %, and in some embodiments, from about 0.05 wt. % to about 50 wt. %, and in some embodiments, from about 0.1 wt. % to about 40 wt. % of a membrane layer.

The membrane layer(s) may be formed using the same or a different technique than used to form the core, such as by hot-melt extrusion, compression molding (e.g., vacuum compression molding), injection molding, solvent casting, dip coating, spray coating, microextrusion, coacervation, etc. In one embodiment, a hot-melt extrusion technique may be employed. The core and membrane layer(s) may also be formed separately or simultaneously. In one embodiment, for instance, the core and membrane layer(s) are separately formed and then combined together using a known bonding technique, such as by stamping, hot sealing, adhesive bonding, etc. Compression molding (e.g., vacuum compression molding) may also be employed to form the implantable device. As described above, the core and membrane layer(s) may be each individually formed by heating and compressing the respective polymer compression into the desired shape while under vacuum. Once formed, the core and membrane layer(s) may be stacked together to form a multi-layer precursor and thereafter and compression molded in the manner as described above to form the resulting implantable device.

III. Use of Device

The implantable device of the present invention may be used in a variety of different ways to prohibit and/or treat a condition, disease, or cosmetic state in a patient. The device may be implanted subcutaneously, orally, mucosally, etc., using standard techniques. The delivery route may be intrapulmonary, gastroenteral, subcutaneous, intramuscular, or for introduction into the central nervous system, intraperitoneum or for intraorgan delivery. As noted above, the implantable device may be particularly suitable for delivering a macromolecular drug compound (e.g., monoclonal antibody) for cancer treatment. In such embodiments, the device may be placed in a tissue site of a patient in, on, adjacent to, or near a tumor, such as a tumor of the pancreas, biliary system, gallbladder, liver, small bowel, colon, brain, lung, eye, etc. The device may also be employed together with current systemic chemotherapy, external radiation, and/or surgery. If desired, the device may be sealed within a package (e.g., sterile blister package) prior to use. The materials and manner in which the package is sealed may vary as is known in the art. In one embodiment, for instance, the package may contain a substrate that includes any number of layers desired to achieve the desired level of protective properties, such as 1 or more, in some embodiments from 1 to 4 layers, and in some embodiments, from 1 to 3 layers. Typically, the substrate contains a polymer film, such as those formed from a polyolefin (e.g., ethylene copolymers, propylene copolymers, propylene homopolymers, etc.), polyester (e.g., polyethylene terephthalate, polyethylene naphthalate, polybutylene terephthalate, etc.), vinyl chloride polymer, vinyl chloridine polymer, ionomer, etc., as well as combinations thereof. One or multiple panels of the film may be sealed together (e.g., heat sealed), such as at the peripheral edges, to form a cavity within which the device may be stored. For example, a single film may be folded at one or more points and sealed along its periphery to define the cavity within with the device is located. To use the device, the package may be opened, such as by breaking the seal, and the device may then be removed and implanted into a patient.

The present invention may be better understood with reference to the following examples.

Test Methods

Drug Release: The release of a drug compound (e.g., lysozyme) may be determined using an in vitro method. More particularly, implantable device samples may be placed in 150 milliliters of an aqueous sodium azide solution. The solutions are enclosed in UV-protected, 250-ml Duran® flasks. The flasks are then placed into a temperature-controlled water bath and continuously shaken at 100 rpm. A temperature of 37° C. is maintained through the release experiments to mimic in vivo conditions. Samples are taken in regular time intervals by completely exchanging the aqueous sodium azide solution. The concentration of the drug compound in solution is determined via UV/Vis absorption spectroscopy using a Cary 100 split beam instrument. From this data, the amount of the drug compound released per sampling interval (microgram per hour) is calculated and plotted over time (hours). Further, the cumulative release ratio of the drug compound is also calculated as a percentage by dividing the amount of the drug compound released at each sampling interval by the total amount of drug compound initially present, and then multiplying this number by 100. This percentage is then plotted over time (hours).

Particle Size: Characterization of particle size distribution and fractionization of lactose, dextrose, and mannitol is performed using a Retsch vibratory sieve shaker and woven wire mesh sieves. The particle size distribution and particle size fraction yield results are shown in the table below.

| Mesh size [µm] | Particle size fraction [µm} | Dextrose yield [wt. %] | Lactose yield [wt. %] |
|---|---|---|---|
| 500 | >500 | — | — |
| 400 | 400-500 | — | — |
| 300 | 300-400 | 22.01 | 1.02 |
| 200 | 200-300 | 21.16 | 1.49 |
| 100 | 100-200 | 27.39 | 8.28 |
| 80 | 80-100 | 10.17 | 15.63 |
| 63 | 63-80 | 3.42 | 15.92 |
| 32 | 32-63 | 3.49 | 34.52 |
|  | <32 | 2.61 | 22.24 |

Examples 1-6

Six (6) different types of core-membrane implantable devices are formed using a core layer containing 40 wt. % of a hydrophobic polymer and 60 wt. % of a macromolecular drug compound in combination with varying concentrations of components in the membrane layers. The core layer is formed by melt compounding lysozyme powder into Ateva® 4030AC using a Haake Rheomix 600p. First, the Rheomix 600p chamber is filled with Ateva® 4030AC pellets and compounded for 5 minutes at 50° C. The compounding in the Rheomix 600p is done at 50 rpm using roller-type rotors. After 5 minutes, the lysozyme powder is added to the Ateva® 4030AC melt and melt mixing continues for 3 minutes at 50° C. After melt mixing, the blend is taken out of the Rheomix 600p and pressed into 1 mm thick sheets using a thermal press. The temperature during pressing is 55° C., the pressing time is 5 minutes, and the pressure is 100 bar. To avoid adhesion of the molten EVA film to the surfaces of the press, a low-adhesion, temperature-tolerant polyester foil (Hostaphan® RNK 23) is placed between the EVA blend and the press plates. After cool down, the polyester films are removed. Discs having a diameter of 23 millimeters are stamped out of the EVA-lysozyme sheet using a punching press to create the lysozyme containing core layer/monolithic lysozyme implants. The membrane layers are formed by melt compounding Ateva® 4030AC and dextrose using a Haake Rheomix 600p in the same manner as described above, except that the temperature used during pressing was 80° C., and the resulting discs had a thickness of 0.1 millimeters and a diameter of 25 millimeters. To form the core-membrane implants, a solvent bonding technique is employed. That is, a small amount of toluene is applied on the sides of the discs using a paintbrush and then immediately thereafter the sandwiched layers are bonded and pressed together. Pressure is maintained for a period of 24 hours as the toluene is allowed to evaporate. After this time period, the edge of the core layer is sealed using a highly concentrated toluene solution of Ateva® 4030AC applied from a plastic pipette. The edges are allowed to dry from toluene for a time period of at least 48 hours. The table below shows the content of the core and membrane layers used in each Example.

| | Core Layer (1 mm × 23 mm) | | 2 Membrane Layers (0.1 mm × 25 mm) | |
|---|---|---|---|---|
| Example | Ateva ® 4030AC (wt. %) | Lysozyme (wt. %) | Ateva ® 4030 (wt. %) | Dextrose (wt. %) |
| 1 | 40 | 60 | 95 | 5 |
| 2 | 40 | 60 | 90 | 10 |
| 3 | 40 | 60 | 85 | 15 |
| 4 | 40 | 60 | 80 | 20 |
| 5 | 40 | 60 | 75 | 25 |
| 6a | 40 | 60 | 70 | 30 |
| 6b | 40 | 60 | 70 | 30 |

Figure 5:
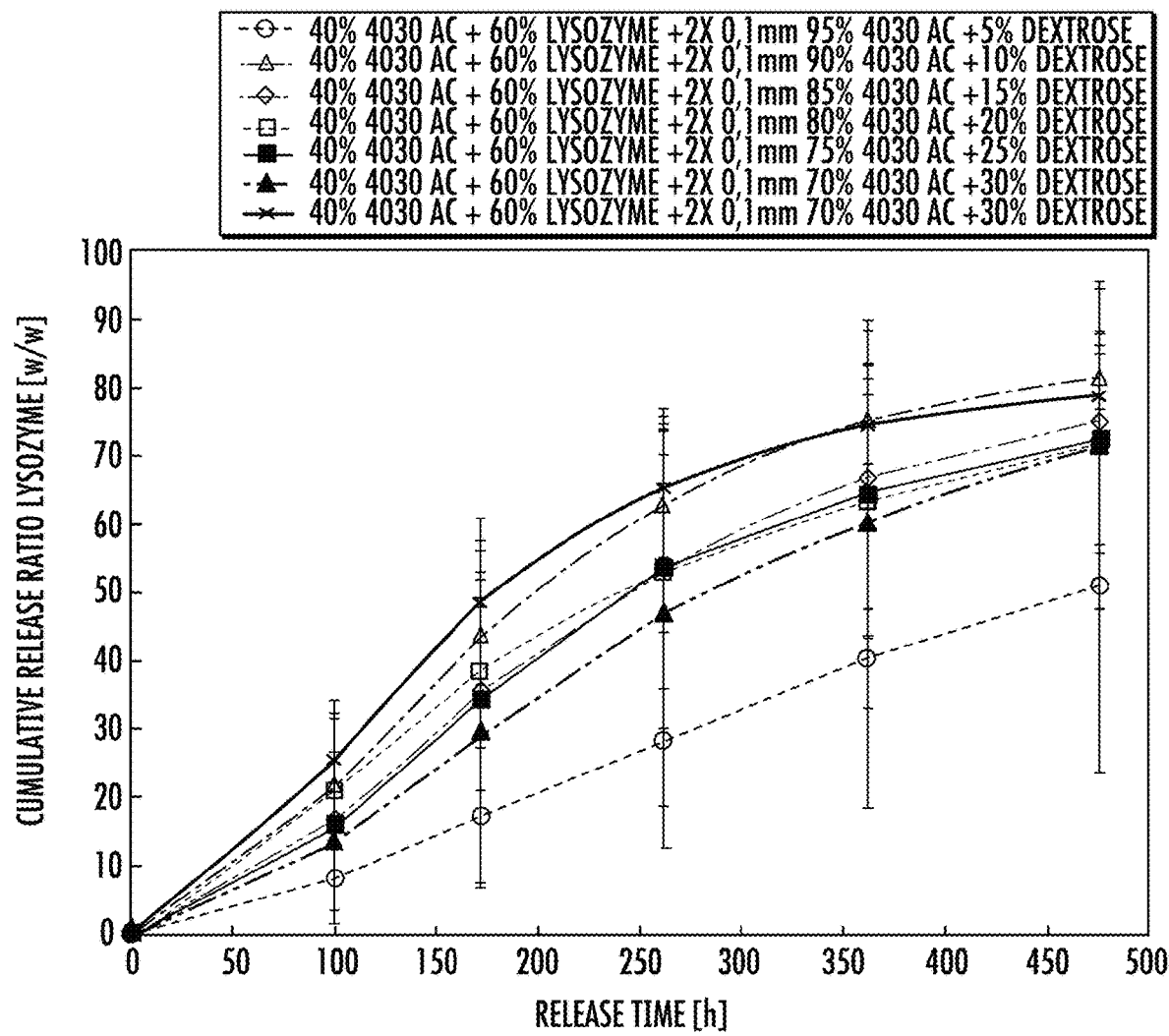
FIG. 5 is a graph showing the cumulative weight-based release ratio of dextrose versus release time (hours) for Examples 1-6.
Figure 6:
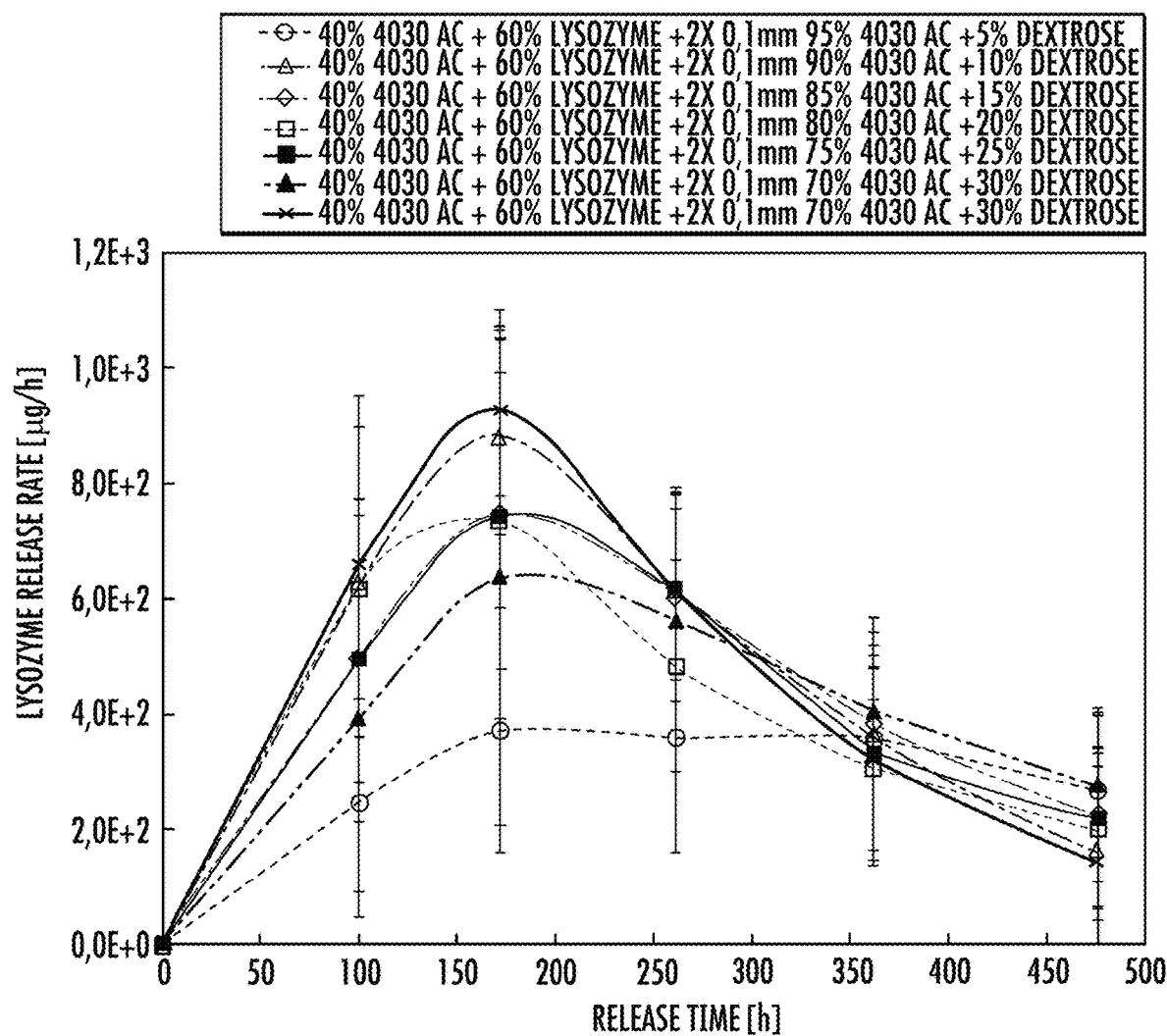
FIG. 6 is a graph showing the release rate of dextrose (μg/h) versus release time (hours) for Examples 1-6.

Once formed, the samples were tested for their release rate as described above. The results are set forth in FIGS. 5-6.

Examples 7-10

Four (4) different types of core-membrane implantable devices are formed using a core layer containing 40 wt. % of a hydrophobic polymer and 60 wt. % of a macromolecular drug compound in combination with varying concentrations of components in the membrane layers. The core layer is formed in the same manner as described above in Examples 1-6. The membrane layers are formed by melt compounding Ateva® 4030AC and the dextrose size fractions described above with particle size smaller than 100 μm using a Haake Rheomix 600p in the same manner as described above, except that the temperature used during pressing was 80° C., and the resulting discs had a thickness of 0.1 millimeters and a diameter of 25 millimeters. To form the core-membrane implants, a solvent bonding technique is employed. That is, a small amount of toluene is applied on the sides of the discs using a paintbrush and then immediately thereafter the sandwiched layers are bonded and pressed together. Pressure is maintained for a period of 24 hours as the toluene is allowed to evaporate. After this time period, the edge of the core layer is sealed using a highly concentrated toluene solution of Ateva® 4030AC applied from a plastic pipette. The edges are allowed to dry from toluene for a time period of at least 48 hours. The table below shows the content of the core and membrane layers used in each Example.

| Example | Core Layer (1 mm × 23 mm) | | 2 Membrane Layers (0.1 mm × 25 mm) | |
|---|---|---|---|---|
| | Ateva® 4030AC (wt. %) | Lysozyme (wt. %) | Ateva® 4030 (wt. %) | Dextrose fraction <100 μm (wt. %) |
| 7 | 40 | 60 | 90 | 10 |
| 8 | 40 | 60 | 80 | 20 |
| 9 | 40 | 60 | 70 | 30 |
| 10 | 40 | 60 | 60 | 40 |

Figure 7:
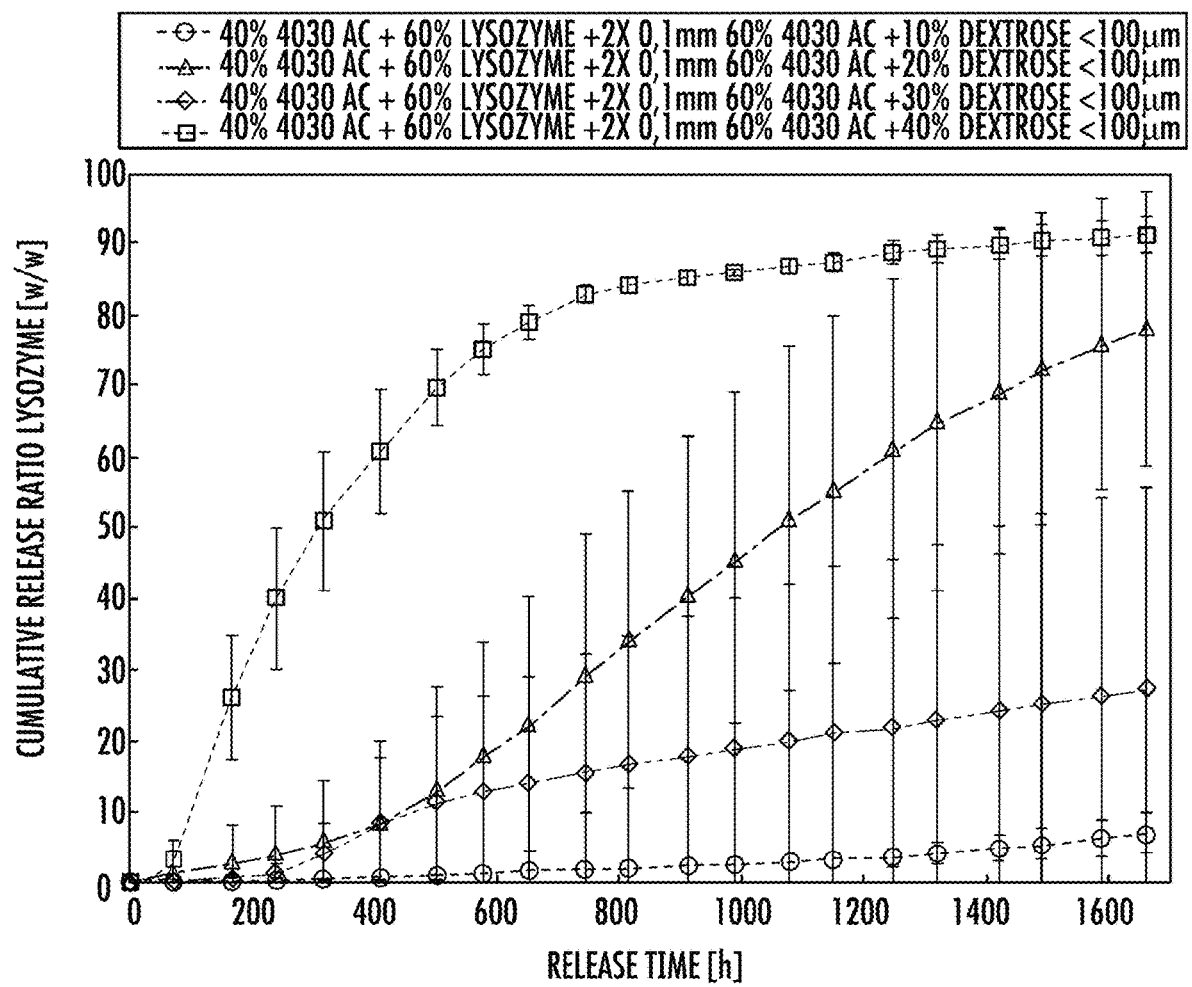
FIG. 7 is a graph showing the cumulative weight-based release ratio of fractionated dextrose versus release time (hours) for Examples 7-10.
Figure 8:
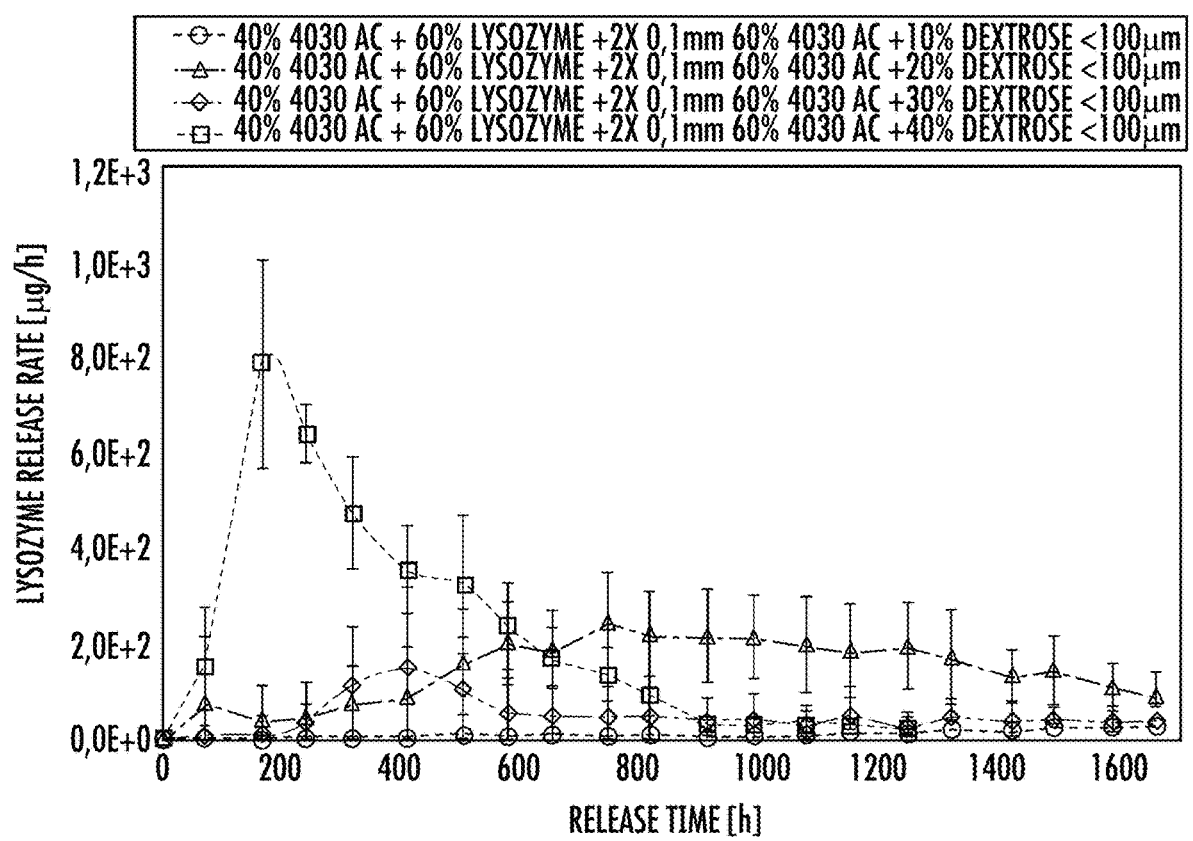
FIG. 8 is a graph showing the release rate of fractionated dextrose (μg/h) versus release time (hours) for Examples 7-10.

Once formed, the samples were tested for their release rate as described above. The results are set forth in FIGS. 7-8.

Examples 11-14

Four (4) different types of core-membrane implantable devices are formed using a core layer containing 40 wt. % of a hydrophobic polymer and 60 wt. % of a macromolecular drug compound in combination with varying concentrations of components in the membrane layers. The core layer is formed in the same manner as described above in Examples 1-6. The membrane layers are formed by melt compounding Ateva® 4030AC and the lactose size fractions described above with particle size smaller than 63 μm using a Haake Rheomix 600p in the same manner as described above, except that the temperature used during pressing was 80° C., and the resulting discs had a thickness of 0.1 millimeters and a diameter of 25 millimeters. To form the core-membrane implants, a solvent bonding technique is employed. That is, a small amount of toluene is applied on the sides of the discs using a paintbrush and then immediately thereafter the sandwiched layers are bonded and pressed together. Pressure is maintained for a period of 24 hours as the toluene is allowed to evaporate. After this time period, the edge of the core layer is sealed using a highly concentrated toluene solution of Ateva® 4030AC applied from a plastic pipette. The edges are allowed to dry from toluene for a time period of at least 48 hours. The table below shows the content of the core and membrane layers used in each Example.

| Example | Core Layer (1 mm × 23 mm) | | 2 Membrane Layers (0.1 mm × 25 mm) | |
|---|---|---|---|---|
| | Ateva® 4030AC (wt. %) | Lysozyme (wt. %) | Ateva® 4030 (wt. %) | Lactose fraction <63 μm (wt. %) |
| 11 | 40 | 60 | 90 | 10 |
| 12 | 40 | 60 | 80 | 20 |
| 13 | 40 | 60 | 70 | 30 |
| 14 | 40 | 60 | 60 | 40 |

Figure 9:
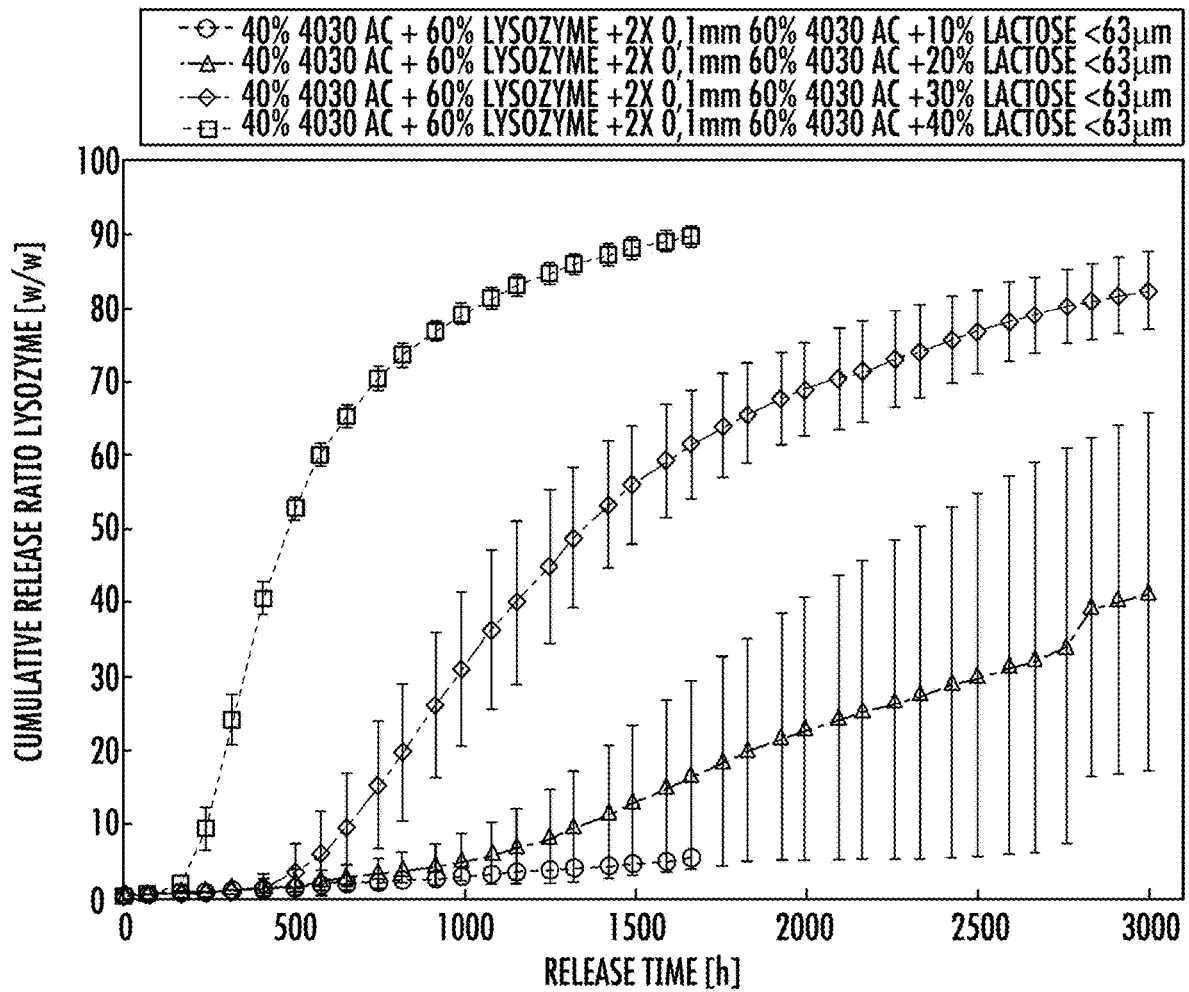
FIG. 9 is a graph showing the cumulative weight-based release ratio of fractionated lactose versus release time (hours) for Examples 11-14.
Figure 10:
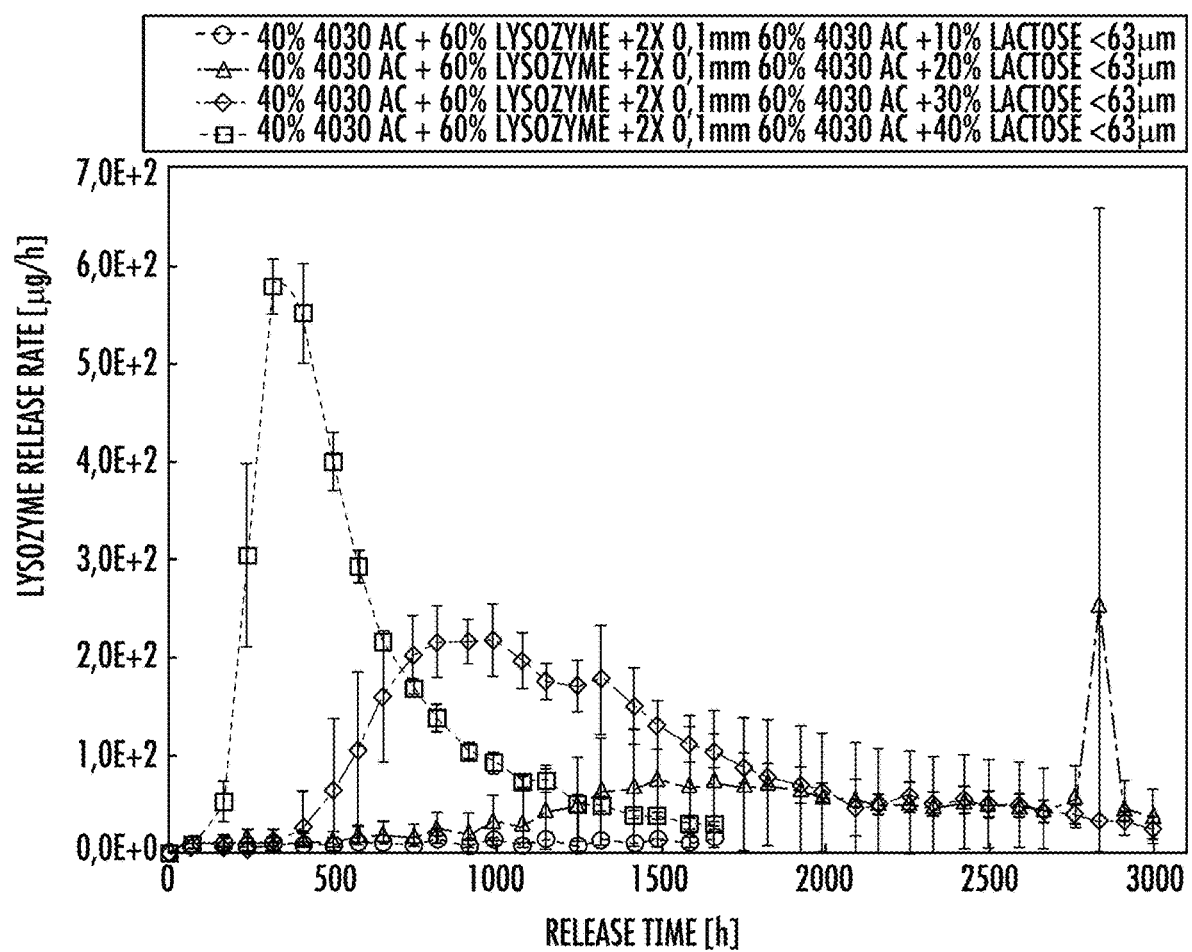
FIG. 10 is a graph showing the release rate of fractionated lactose (μg/h) versus release time (hours) for Examples 11-14.

Once formed, the samples were tested for their release rate as described above. The results are set forth in FIGS. 9-10.

Examples 15-17

Three (3) different types of core-membrane implantable devices are formed using a core layer containing 40 wt. % of a hydrophobic polymer and 60 wt. % of a macromolecular drug compound in combination with varying concentrations of components in the membrane layers. The core layer material is formed by melt extruding lysozyme powder into Ateva® 4030AC using an 18 mm twin-screw extruder. Extrusion was accomplished using a screw speed of 75 rpm with barrel temperatures set to achieve a nominal melt temperature of 70° C., and a feed throat temperature of 40° C. The membrane layer material is formed by melt extruding lactose with size fractions described above with a particle size smaller than 63 μm into Ateva® 4030AC using an 18 mm twin-screw extruder. Extrusion was accomplished using a screw speed of 75 rpm with barrel temperatures set to achieve a nominal melt temperature of 70° C., and a feed throat temperature of 40° C. Rods are then prepared co-extruding the core and membrane materials using two single screw extruders feeding a co-axial die. The total diameter of the rod was controlled by adjusting the take-up speed of the extruded strand and the relative thickness of the core/membrane layers was controlled by adjusting the extrusion feeding rate. More particularly, the temperatures for both the core and membrane extruders were set to achieve a nominal polymer melt temperature of 70° C. The extruder for the core layer was set with a rotational rate of 10 rpm. The extruder for the membrane layers was set with a rotational rate of 5 rpm. The final rod samples had a core diameter of 3.5 mm and a membrane thickness of 0.2 mm. The table below shows the content of the core and membrane layers used in each Example.

| Example | Core Layer (3.5 mm diameter) | | 2 Membrane Layers (0.2 mm × 25 mm) | |
|---|---|---|---|---|
| | Ateva® 4030AC (wt. %) | Lysozyme (wt. %) | Ateva® 4030 (wt. %) | Lactose fraction <63 μm (wt. %) |
| 15 | 40 | 60 | 80 | 20 |
| 16 | 40 | 60 | 75 | 25 |
| 17 | 40 | 60 | 70 | 30 |

Figure 11:
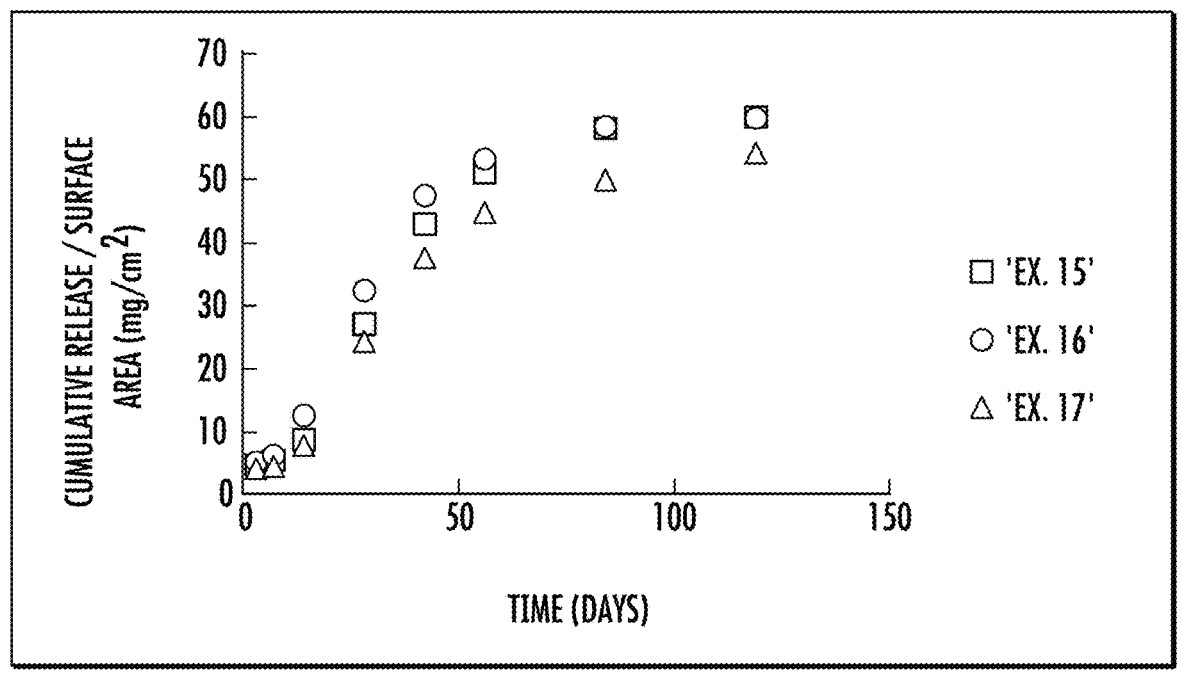
FIG. 11 is a graph showing the cumulative surface area-based release ratio of fractionated lactose versus release time (hours) for Examples 15-17.
Figure 12:
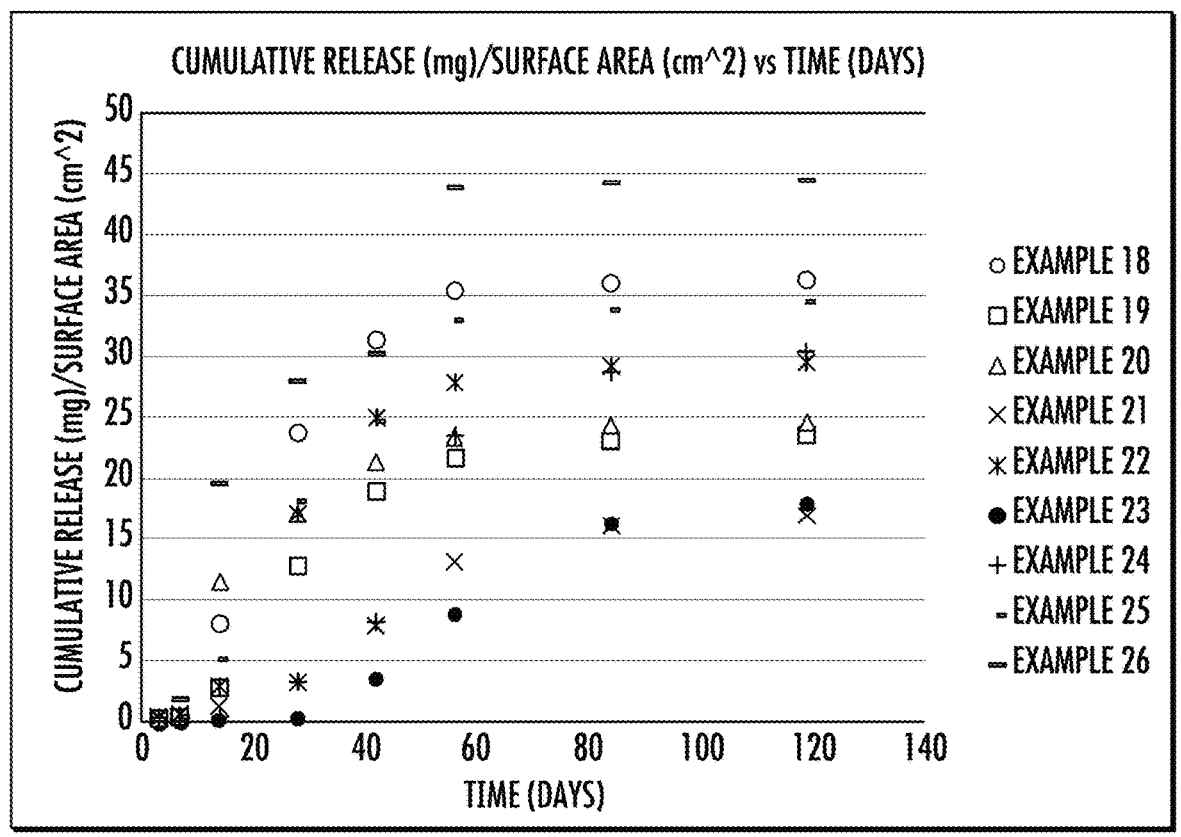
FIG. 12 is a graph showing the cumulative surface area-based release ratio of fractionated mannitol versus release time (hours) for Examples 18-26.

Rods were cut to 3 cm lengths for elution testing. The release of lysozyme from these rods into PBS buffer was measured in a shaking incubator maintained at 37° C. At regular intervals, the buffer was exchanged with fresh buffer, and the removed buffer characterized using UV-Vis absorbance spectroscopy to measure the concentration of lysozyme released. The results are set forth in FIG. 11.

Examples 18-26

Nine (9) different types of core-membrane implantable devices are formed using a core layer containing 40 wt. % of a hydrophobic polymer and 60 wt. % of a macromolecular drug compound in combination with varying concentrations of components in the membrane layers. The core layer material is formed by melt extruding lysozyme powder into Ateva® 4030AC using an 18 mm twin-screw extruder. Extrusion was accomplished using a screw speed of 75 rpm with barrel temperatures set to achieve a nominal melt temperature of 70° C., and a feed throat temperature of 40° C. The membrane layer material is formed by melt extruding mannitol with various size fractions as noted in the table below into Ateva® 4030AC using an 11 mm twin-screw extruder. Extrusion was accomplished using a screw speed of 150 rpm with barrel temperatures set to achieve a nominal melt temperature of from 65° C. to 75° C., and a feed throat temperature of about 25° C.

Discs were then formed using a multi-step process via vacuum compression molding. To form the core layer, the core layer material is placed in a small chamber, heated, and then compressed into a mold under vacuum at a temperature of 120° C. for 15 minutes. The material was then cooled for 5 minutes under vacuum. To form the membrane layers, the membrane layer material is likewise placed in a small chamber, heated, and then compressed into a mold under vacuum at a temperature of 85° C. for 10 minutes, followed by cooling for 3 minutes under vacuum. Multi-layer disc structures are then built up by stacking a first membrane layer, core layer, and a second membrane layer, placing the stacked layers in the mold, and then applying heat and compression under vacuum in the same machine at a temperature of 85° C. for 10 minutes, followed by cooling under vacuum for 3 minutes. The edges of the disc structures are then sealed using a highly concentrated toluene solution of Ateva® 4030AC applied from a plastic pipette. The edges are allowed to dry from toluene for a time period of at least 48 hours. The table below shows the content of the core and membrane layers used in each Example.

| | Core Diameter (2 cm) Thickness (1 mm) | | Membrane Thickness (0.2 mm) | |
|---|---|---|---|---|
| Example | Ateva® 4030AC (wt. %) | Lysozyme (wt. %) | Ateva® 4030 (wt. %) | Mannitol <25 µm (wt. %) |
| 18 | 40 | 60 | 80 | 20 |
| 19 | 40 | 60 | 70 | 30 |
| 20 | 40 | 60 | 65 | 35 |
| | | | | Mannitol 25-75 µm (wt. %) |
| 21 | 40 | 60 | 80 | 20 |
| 22 | 40 | 60 | 70 | 30 |
| 23 | 40 | 60 | 65 | 35 |
| | | | | Mannitol 75-125 µm (wt. %) |
| 24 | 40 | 60 | 80 | 20 |
| 25 | 40 | 60 | 70 | 30 |
| 26 | 40 | 60 | 65 | 35 |

Example 27-29

Three (3) different types of core-membrane implantable devices are formed using a core layer containing 40 wt. % of a hydrophobic polymer and 60 wt. % of a macromolecular drug compound in combination with varying concentrations of components in the membrane layers. The core layer material is formed by melt extruding lysozyme powder into Ateva® 4030AC using an 18 mm twin-screw extruder. Extrusion was accomplished using a screw speed of 75 rpm with barrel temperatures set to achieve a nominal melt temperature of 70° C., and a feed throat temperature of 40° C. The membrane layer material is formed by melt extruding lactose with various size fractions as noted in the table below into Ateva® 4030AC using an 11 mm twin-screw extruder. Extrusion was accomplished using a screw speed of 150 rpm with barrel temperatures set to achieve a nominal melt temperature of from 65° C. to 75° C., and a feed throat temperature of about 25° C.

Discs were then formed using a multi-step process via vacuum compression molding. To form the core layer, the core layer material is placed in a small chamber, heated, and then compressed into a mold under vacuum at a temperature of 120° C. for 15 minutes. The material was then cooled for 5 minutes under vacuum. To form the membrane layers, the membrane layer material is likewise placed in a small chamber, heated, and then compressed into a mold under vacuum at a temperature of 80° C. for 8 minutes, followed by cooling for 2 minutes under vacuum. Multi-layer disc structures are then built up by stacking a first membrane layer, core layer, and a second membrane layer, placing the stacked layers in the mold, and then applying heat and compression under vacuum in the same machine at a temperature of 80° C. for 8 minutes, followed by cooling under vacuum for 2 minutes. The edges of the disc structures are then sealed using a highly concentrated toluene solution of Ateva® 4030AC applied from a plastic pipette. The edges are allowed to dry from toluene for a time period of at least 48 hours. The table below shows the content of the core and membrane layers used in each Example.

| | Core Diameter (2 cm) Thickness (1 mm) | | Membrane Thickness (0.2 mm) | |
|---|---|---|---|---|
| Example | Ateva® 4030AC (wt. %) | Lysozyme (wt. %) | Ateva® 4030 (wt. %) | Lactose fraction <63 µm (wt. %) |
| 27 | 40 | 60 | 80 | 20 |
| 28 | 40 | 60 | 70 | 30 |
| 29 | 40 | 60 | 65 | 35 |

Figure 13:
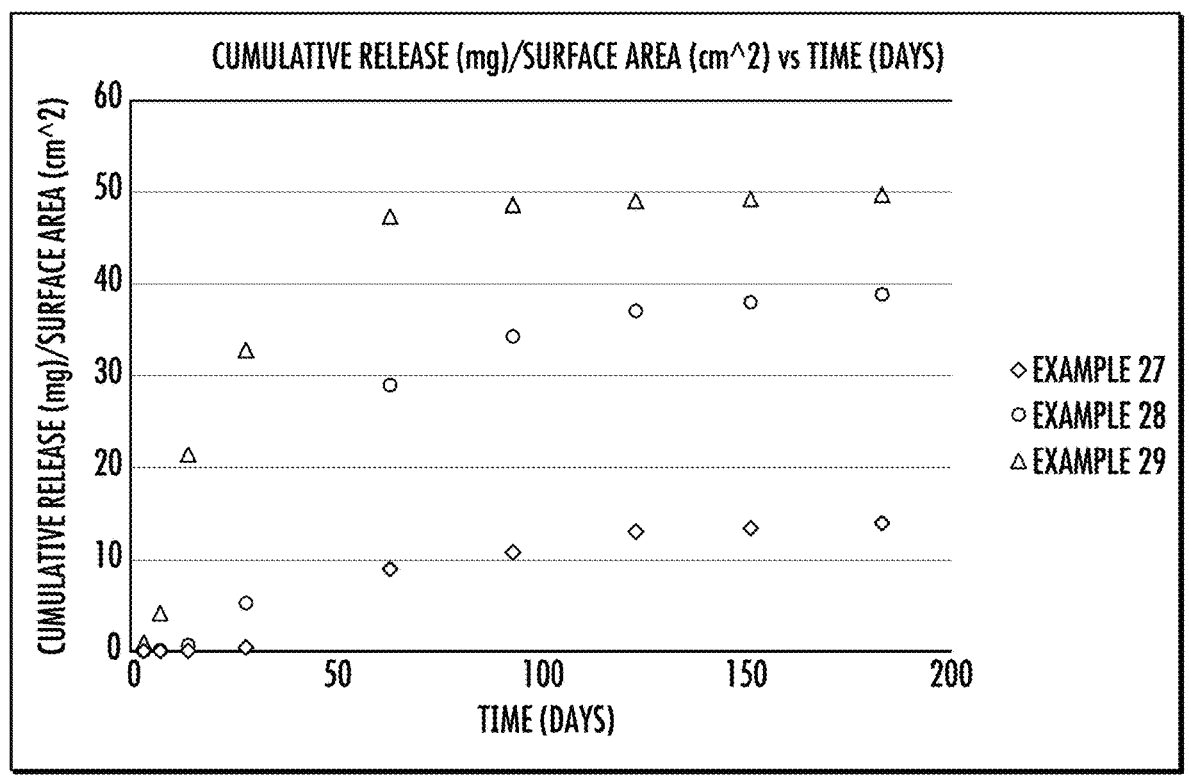
FIG. 13 is a graph showing the cumulative surface area-based release ratio of fractionated lactose versus release time (hours) for Examples 27-29.

The sealed multi-layer discs were used for elution testing. The release of lysozyme from these discs into PBS buffer was measured in a shaking incubator maintained at 37° C. At regular intervals, the buffer was exchanged with fresh buffer, and the removed buffer characterized using UV-Vis absorbance spectroscopy to measure the concentration of lysozyme released. The results are set forth in FIG. 13.

Example 30

Figure 14:
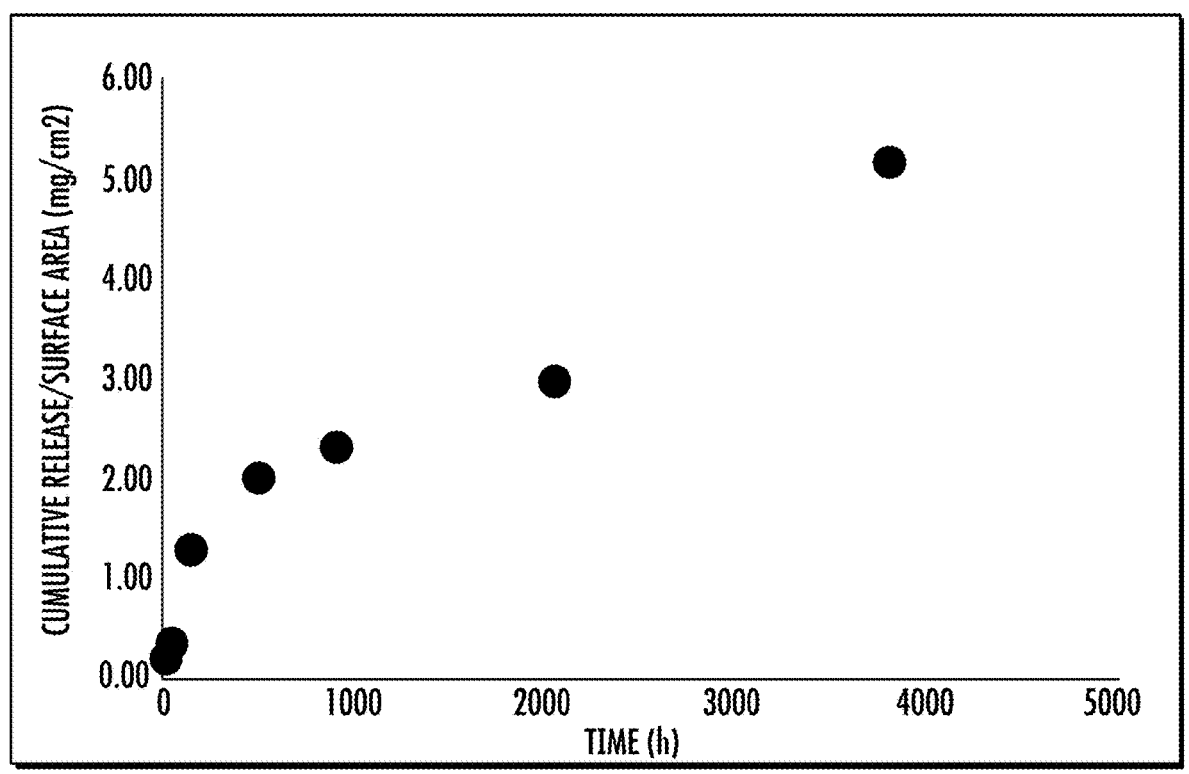
FIG. 14 is a graph showing the cumulative surface area-based release of IgG versus release time (hours) for Example 30.

The ability to form a core polymer matrix for releasing an antibody was demonstrated. More particularly, a rod-shaped monolithic implant containing human plasma derived IgG antibody was produced via extrusion. The core polymer matrix contained 60 wt. % Ateva® 4030AC and 40 wt. % IgG antibody and was formed by melt extruding the components using a 11 mm twin-screw extruder. Extrusion was accomplished using a screw speed of 50 rpm with barrel temperatures set to achieve a nominal melt temperature of 60° C. Rods were cut to 3 cm lengths for elution testing. The release of IgG antibody from these rods into PBS buffer was measured in a shaking incubator maintained at 37° C. At regular intervals, the buffer was exchanged with fresh buffer, and the removed buffer characterized using UV-Vis absorbance spectroscopy to measure the concentration of IgG antibody released. The cumulative quantity released normalized by a sample surface area is shown in FIG. 14.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An implantable device for delivery of a macromolecular drug compound, the implantable device comprising:
   a core having an outer surface, wherein the core comprises a core polymer matrix within which is dispersed a drug compound having a molecular weight of about 0.5 kDa or more, the core polymer matrix containing a hydrophobic polymer; and
   a membrane layer positioned adjacent to the outer surface of the core, wherein the membrane layer comprises a plurality of water-soluble particles distributed within a membrane polymer matrix containing an ethylene vinyl acetate copolymer, wherein the water-soluble particles have a D50 particle size of from about 100 micrometers to about 150 micrometers and contain a non-polymeric, hydroxy-functional compound.

2. The implantable device of claim 1, wherein the non-polymeric, hydroxy-functional compound includes a monosaccharide.

3. The implantable device of claim 2, wherein the monosaccharide includes dextrose, fructose, galactose, or a combination thereof.

4. The implantable device of claim 1, wherein the non-polymeric, hydroxy-functional compound includes a disaccharide.

5. The implantable device of claim 4, wherein the disaccharide includes sucrose, lactose, maltose, ribose, deoxyribose, or a combination thereof.

6. The implantable device of claim 1, wherein the non-polymeric, hydroxy-functional compound includes a sugar alcohol.

7. The implantable device of claim 6, wherein the sugar alcohol includes xylitol, sorbitol, mannitol, maltitol, erythritol, galactitol, isomalt, inositol, lactitol, or a combination thereof.

8. The implantable device of claim 1, wherein the non-polymeric, hydroxy-functional compound has a molecular weight of from about 1 to about 650 grams per mole.

9. The implantable device of claim 1, wherein the device has a generally circular cross-sectional shape.

10. The implantable device of claim 1, wherein the device is in the form of a cylinder.

11. The implantable device of claim 1, wherein the device is in the form of a disc.

12. The implantable device of claim 1, wherein macromolecular drug compounds constitute from about 5 wt. % to about 60 wt. % of the core and the core polymer matrix constitutes from about 40 wt. % to about 95 wt. % of the core.

13. The implantable device of claim 1, wherein the device is capable of releasing the macromolecular drug compound for a time period of about 5 days or more.

14. The implantable device of claim 1, wherein the water-soluble particles have a D50 particle size of about 100 micrometers or less.

15. The implantable device of claim 1, wherein after a time period of 15 days, the device exhibits a cumulative weight-based release ratio of the macromolecular drug compound of from about 20% to about 70%.

16. The implantable device of claim 1, wherein after a time period of 30 days, the device exhibits a cumulative weight-based release ratio of the macromolecular drug compound of from about 40% to about 85%.

17. The implantable device of claim 1, wherein after a time period of 30 days, the device exhibits a cumulative surface area-based release ratio of from about 5 to about 70 mg/cm$^2$.

18. The implantable device of claim 1, wherein after a time period of 90 days, the device exhibits a cumulative surface area-based release ratio of from about 15 to about 70 mg/cm$^2$.

19. The implantable device of claim 1, wherein after a time period of 120 days, the device exhibits a cumulative surface area-based release ratio of from about 30 to about 70 mg/cm$^2$.

20. The implantable device of claim 1, wherein the ethylene vinyl acetate copolymer has a vinyl acetate monomer content of from about 25 wt. % to about 50 wt. %, a melt flow index of from about 10 to about 80 grams per 10 minutes as determined in accordance with ASTM D1238-20 at a temperature of 190° C. and a load of 2.16 kilograms, and/or a melting temperature of from about 60° C. to about 120° C. as determined in accordance with ASTM D3418-15.

21. The implantable device of claim 1, wherein the hydrophobic polymer includes an ethylene vinyl acetate copolymer.

22. The implantable device of claim 17, wherein the ethylene vinyl acetate copolymer in the core polymer matrix has a vinyl acetate monomer content of from about 25 wt. % to about 50 wt. %, a melt flow index of from about 10 to about 80 grams per 10 minutes as determined in accordance with ASTM D1238-20 at a temperature of 190° C. and a load of 2.16 kilograms, and/or a melting temperature of from about 60° C. to about 120° C. as determined in accordance with ASTM D3418-15.

23. The implantable device of claim 1, wherein the macromolecular drug compound is a protein, peptide, enzyme, antibody, interferon, interleukin, blood factor, vaccine, nucleotide, lipid, or a combination thereof.

24. The implantable device of claim 1, wherein the macromolecular drug compound includes an antibody.

25. The implantable device of claim 24, wherein the antibody is a monoclonal antibody.

26. The implantable device of claim 1, wherein the macromolecular drug compound includes an anti-PD-1 antibody, anti-PD-L1 antibody, or a combination thereof.

27. The implantable device of claim 1, wherein the membrane polymer matrix constitutes from about 50 wt. % to about 99 wt. % of the membrane layer.

28. The implantable device of claim 1, wherein the membrane layer is free of the macromolecular drug compound.

29. The implantable device of claim 1, wherein the water-soluble particles constitute from about 1 wt. % to about 50 wt. % of the membrane layer.

30. The implantable device of claim 1, wherein the core defines an outer circumferential surface about which the m membrane layer is circumferentially disposed.

31. The implantable device of claim 1, wherein the core defines an upper outer surface and a lower outer surface, the membrane layer being disposed adjacent to the upper outer surface.

32. The implantable device of claim 31, further comprising a second membrane layer positioned adjacent to the lower outer surface.

33. The implantable device of claim 32, wherein the second membrane layer comprises a second polymer matrix that comprises a plurality of second water-soluble particles dispersed within a second membrane polymer matrix containing an ethylene vinyl acetate copolymer, wherein the second water-soluble particles have a D50 particle size of about 100 micrometers or less and contain a non-polymeric, hydroxy-functional compound.

34. The implantable device of claim 32, wherein the second membrane layer is free of the macromolecular drug compound.

35. The implantable device of claim 1, wherein the core, membrane layer, or both are formed from a hot melt extrusion process.

36. The implantable device of claim 1, wherein the core, membrane layer, or both are formed from compression molding.

37. A method for prohibiting and/or treating a condition, disease, and/or cosmetic state of a patient, the method comprising subcutaneously implanting the device of claim 1 in the patient.

38. A polymer composition for use in a drug delivery device comprising from about 50 wt. % to about 99.5 wt. % of a polymer matrix that contains an ethylene vinyl acetate copolymer and from about 1 wt. % to about 50 wt. % of a plurality of water-soluble particles distributed within the polymer matrix, wherein the ethylene vinyl acetate copolymer has a vinyl acetate monomer content of from about 25 wt. % to about 50 wt. %, a melt flow index of from about 10 to about 80 grams per 10 minutes as determined in accordance with ASTM D1238-20 at a temperature of 190° C. and a load of 2.16 kilograms, and/or a melting temperature of from about 60° C. to about 120° C. as determined in accordance with ASTM D3418-15, and further wherein the water-soluble particles have a D50 particle size of about 150 micrometers or less and contain a non-polymeric, hydroxy-functional compound, wherein the hydroxy-functional compound includes a saccharide or a derivative thereof.

* * * * *